(12) United States Patent
Vitenberg

(10) Patent No.: US 7,443,917 B2
(45) Date of Patent: Oct. 28, 2008

(54) METHOD AND SYSTEM FOR TRANSMISSION OF INFORMATION DATA OVER A COMMUNICATION LINE

(75) Inventor: Roman Vitenberg, Petach Tikva (IL)

(73) Assignee: Data JCE Ltd, Tel-Aviv (IL)

( * ) Notice: Subject to any disclaimer, the term of this patent is extended or adjusted under 35 U.S.C. 154(b) by 831 days.

(21) Appl. No.: 10/844,586

(22) Filed: May 13, 2004

(65) Prior Publication Data

US 2005/0047513 A1    Mar. 3, 2005

Related U.S. Application Data

(60) Provisional application No. 60/499,101, filed on Sep. 2, 2003.

(51) Int. Cl.
*H04K 1/10*    (2006.01)
(52) U.S. Cl. .................. 375/260; 375/135; 375/136; 375/146; 375/147; 375/210; 375/350
(58) Field of Classification Search ................ 375/260, 375/135, 136, 146, 147, 350; 370/210
See application file for complete search history.

(56) References Cited

U.S. PATENT DOCUMENTS

| 5,479,447 | A | 12/1995 | Chow et al. |
| 5,497,398 | A | 3/1996 | Tzannes et al. |
| 6,278,686 | B1 | 8/2001 | Alard |
| 6,665,349 | B1 | 12/2003 | Cherubini et al. |
| 6,735,221 | B1 | 5/2004 | Cherubini |
| 6,741,551 | B1 | 5/2004 | Cherubini |
| 7,031,379 | B2* | 4/2006 | Sestok et al. ................. 375/219 |
| 7,218,642 | B2* | 5/2007 | Insler et al. .................. 370/465 |
| 2003/0026201 | A1* | 2/2003 | Arnesen ..................... 370/210 |
| 2003/0063680 | A1* | 4/2003 | Nedic et al. ................. 375/260 |

OTHER PUBLICATIONS

Xie, Y., et al., "A combined DMT/DWMT system for DSL application", *Signal Processing*, vol. 80, pp. 185-195, (2000).
Sandberg, S.D., et al., "Overlapped Discrete Multitone Modulation for High Speed Copper Wire Communications", *IEEE Journal on Selected Areas in Communications*, vol. 13, No. 9, pp. 1571-1585, (1995).

(Continued)

*Primary Examiner*—Shuwang Liu
*Assistant Examiner*—Kabir A Timory
(74) *Attorney, Agent, or Firm*—The Nath Law Group; Jerald L. Meyer; Stanley N. Protigal

(57) ABSTRACT

A transceiver system and method comprises a transmitter and a receiver. The transmitter includes a synthesis filter bank and an overlapping unit. The synthesis filter bank generates and modulates a set of wavelets. The overlapping unit generates a multicarrier signal carrying the information data and provides it to the communication line. The receiver includes a separating unit having a separating shift register and an analyzing filter bank having an N-points FFT unit and a demodulator coupled thereto. The method includes at the transmitter end providing a sequence of prototype wavelets by using N-points IFFT, modulating the sequence of the prototype wavelets by said information data, overlapping the modulated prototype wavelets to generate a multicarrier signal carrying the information data. The method includes at the receiver end separating overlapped wavelets from the multicarrier signal, analyzing the separated wavelets by using an N-points FFT, and demodulating spectral frequency amplitudes of the wavelets.

24 Claims, 25 Drawing Sheets

OTHER PUBLICATIONS

Contribution T1E1. 4/2003-188; "Olympic gold for DMT"; Alcatel; Jun. 18, 2003.

Tzannes, M. A. et al., "The DWMT: A Multicarrier Transceiever for ADSL Using M-band Wavelet Transforms", ADSL, T1E1.4, Mar. 8, 1993.

Cherubini, G. et al., "Filtered Multitone Modulation for Very High-Speed Digital Subscriber Lines", *IEEE Journal on Selected Areas in Communications*, vol. 20, No. 5, pp. 1016-1028, (2002).

ITU contribution Filtered Multitone Modulation:, Geneva, Jun. 21-Jul. 2, 1999.

* cited by examiner

FIG. 1 (*Prior Art*)

FIG. 3 (Prior art)   Frequency

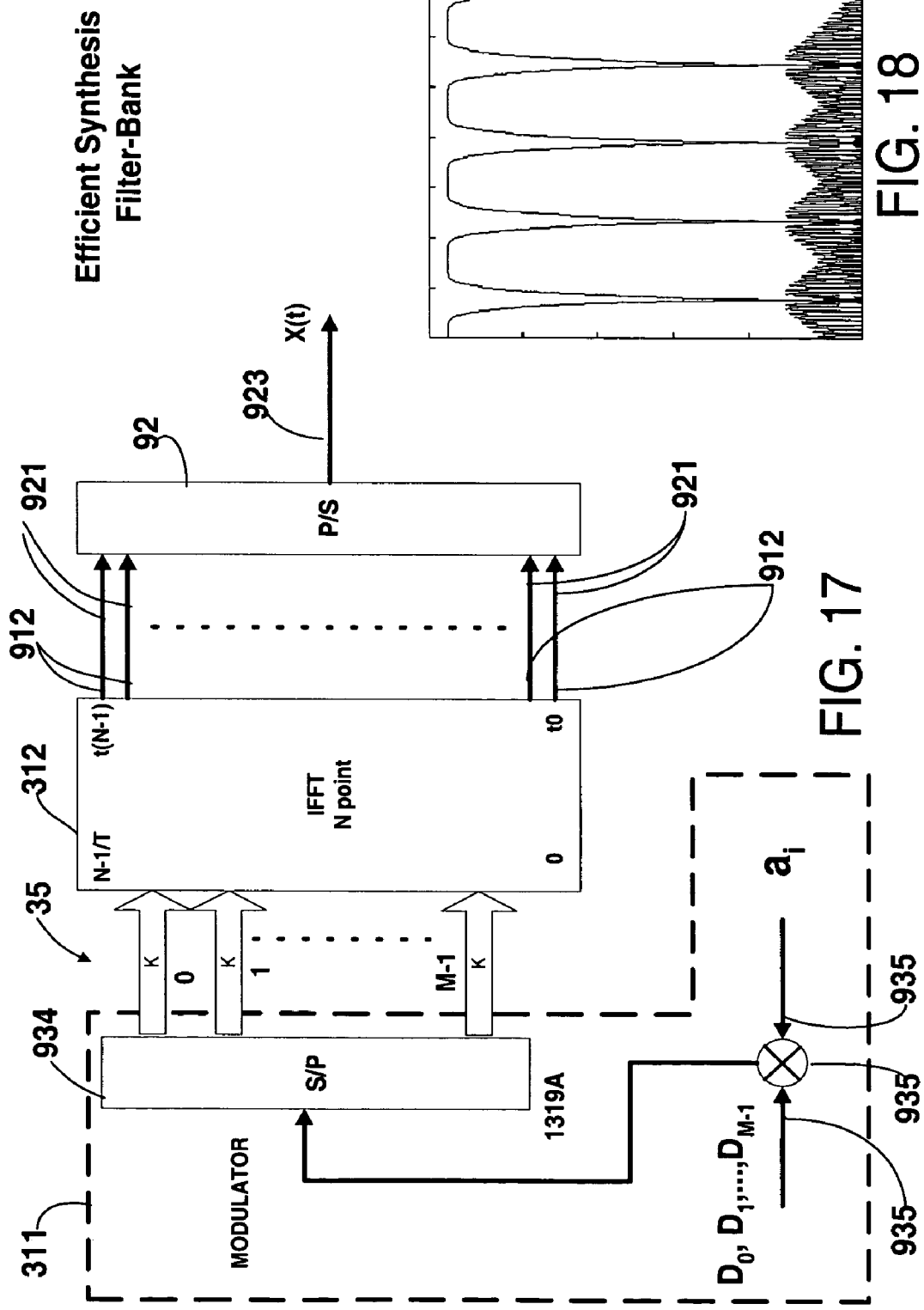

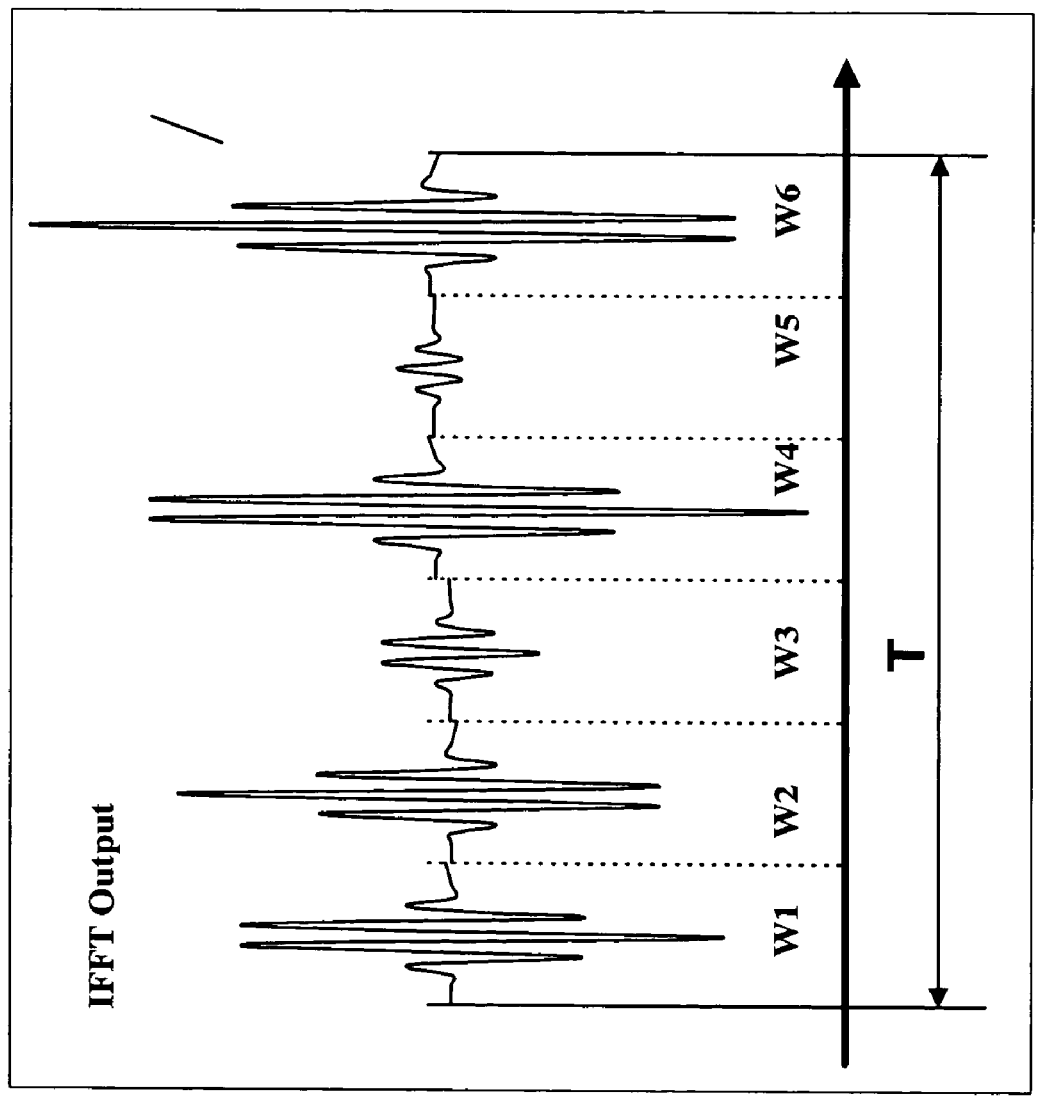

METHOD AND SYSTEM FOR TRANSMISSION OF INFORMATION DATA OVER A COMMUNICATION LINE

This application claims the benefit of prior U.S. provisional patent application no. 60/499,101 filed Sep. 2, 2003, the contents of which are hereby incorporated by reference in their entirety.

FIELD OF THE INVENTION

The present invention relates to a method and system for multicarrier transmission of information data over wired or wireless communications channel using a Filtered Multi-Tone (FMT) modulation, and more particularly to digital subscribe line (xDSL) techniques using transmission of multicarrier signals over twisted pair telephone cable.

BACKGROUND OF THE INVENTION

The demand for provision of multi-media applications and other broadband services over telecommunications networks has created a need to transmit high bit rate traffic over a pair of copper wires. This requirement has led to the development of different Digital Subscriber Line (DSL) transmission schemes. Several examples of variations on the DSL technology are represented below, which are often denoted by the term xDSL (where x is a variable, when the discussion is about DSL in general).

Asymmetric DSL (ADSL)—that is called "asymmetric" because the downstream data transmission rate is greater than the upstream transmission. In particular, ADSL works this way due to the fact that most Internet users look at, or download, much more information than they send, or upload.

High bit-rate DSL (HDSL)—that receives and sends data at the same speed, but it requires two lines that are separate from the normal phone line.

ISDN DSL (ISDL)—that is slower than most other forms of DSL, however has an advantage for Integrated Services Digital Network (ISDN) customers in the fact that they can use their existing equipment, but the actual speed gain is typically only 16 Kbps, while ISDN runs at 128 Kbps.

Rate Adaptive DSL (RADSL)—This is a popular variation of ADSL that allows the modem to adjust the speed of the connection depending on the length and quality of the line.

Symmetric DSL (SDSL)—This scheme receives and sends data at the same speed and uses only a single line instead of the two used by HDSL.

Very high speed DSL (VDSL)—A rather fast connection, VDSL is asymmetric, but only works over a short distance using standard copper phone wiring.

Voice-over DSL (VoDSL)—This scheme allows multiple phone lines to be combined into a single phone line that also includes data-transmission capabilities.

Two of the above technologies, ADSL and VDSL, currently dominate the industry. The VDSL technology can be regarded as an evolution of ADSL and represents the next step in the DSL technology for two-way broadband network access. Four modulation techniques (line codes) have been proposed in the art for xDSL, such as: Discrete Multi-Tone modulation (DMT) modulation, carrierless amplitude and phase (CAP) modulation, Discrete Wavelet Multi-Tone (DWMT) modulation and Filtered Multi-Tone (FMT) modulation. More specifically:

DMT modulation is the discrete time implementation of orthogonal frequency division multiplexing (OFDM), where the available bandwidth is divided into a plurality of subchannels (e.g., 255 subchannels), each subchannel with a small bandwidth, e.g., about 4 kHz (or 1000 cycles per second). Traffic is allocated to the different sub-channels in dependence on noise power and transmission loss in each sub-channel. Usually, each sub-channel carries multi-level pulses capable of representing up to 15 data bits. Poor quality sub-channels carry fewer bits, or may be completely shut down (see, for example, U.S. Pat. No. 5,479,447, Chow, et al.). DMT modulation can effectively achieve this sub-channel arraying within the one transceiver set by utilizing the Inverse Fast Fourier Transform (IFFT) to create individual carriers and its counterpart, the Fast Fourier Transform (FFT) for demodulation. DMT can use FDM for upstream/downstream multiplexing, although DMT does not preclude a TDMA multiplexing strategy. This modulation method is mainly used hitherto in ADSL.

CAP operates by dividing the signals on the telephone line into three distinct bands. More specifically, voice conversations are usually carried in the zero- to 4-KHz band, used in all standard phone circuits. Moreover, the upstream channel is used that is carried in a band between 25 and 160 KHz. Likewise, the downstream channel begins at 240 KHz and goes up to a point that varies with such conditions as line length, line noise and the number of users in the switch, but it has a maximum of about 1.5 megahertz (MHz).

CAP is closely related to quadrature amplitude modulation (QAM). QAM typically generates a double sideband suppressed carrier signal constructed from two multi-level pulse amplitude modulated (PAM) signals applied in phase quadrature to one another. In other words, in a QAM signal, there are two carriers (i.e., the I signal and the Q signal), each having the same frequency but differing in phase by 90 degrees (one quarter of a cycle). Mathematically, one of the signals can, for example, be represented by a sine wave, and the other by a cosine wave. The two modulated waves are combined at the source for transmission. At the destination, the waves are separated, the data is extracted from each, and then the data is combined into the original modulating information. CAP modulation produces the same form of signals as QAM without requiring in-phase and quadrature components of the carrier to first be generated. The CAP technique, employing the three channels widely separated, minimizes the possibility of interference between the channels on one line, or between the signals on different lines.

DWMT is a multi-carrier technique utilizing a Wavelet Transform to create and demodulate individual carriers. The generation of the subchannels and their modulation is being done by an inverse fast wavelet transform (IFWT) and the corresponding demodulation by a fast wavelet transform (FWT). Contrary to DMT technique, DWMT uses overlap in the time domain in order to achieve a higher spectral containment of the subchannels in the frequency domain. The subchannels of a DWMT system have half the frequency spacing between their subchannels, compared with DMT, and employ one-dimensional PAM instead of QAM. The drawback of this technique is the increased complexity due to longer filter lengths and the necessity of buffering the previous transmit blocks. The advantage is that the spectral overlap between the subchannels is much smaller than in case of DMT.

It should be noted that only two of these line codes, namely CAP and DMT, can practically be used for VDSL systems. In particular, the DMT line code provides significantly better performance of a VDSL system than the CAP line code. That is a reason why only DMT line code has been standardized for VDSL systems by T1E1 Committee (Contribution T1E1.4/2003-188; "Olympic gold for DMT"; Alcatel; Jun. 18, 2003). On the other hand, the DWMT line code has better theoretical characteristics than DMT, but has not been yet realized because of its very hard implementation complexity.

One of the recognized problems associated with DMT is a poor separation between the subchannels. U.S. Pat. No. 5,497,398 to Tsannes et al. proposed a technique for ameliorating the problem of signal degradation associated with subchannel loss. This technique allows to obtain a superior burst noise immunity. This was achieved by replacing the Fast Fourier Transform (FFT) with the lapped transform, thereby increasing the difference between the main lobe and side lobes of the filter response in each sub-channel. The lapped transform can provide wavelets, as was disclosed by M. A. Tsannes et al. in an article "The DWMT: A Multicarrier Transceiver for ADSL using M-band Wavelets", ANSI, T1E1.4 Contribution 93-067, March 1993.

One of the common disadvantages of DMT and DWMT techniques is related to the fact that they typically use a large number of subchannels (namely, 2048 or 4096 for VDSL), that leads to a rather complex and costly equipment. Moreover, DMT and DWMT systems suffer from difficulties during equalization and synchronization.

The recently proposed FMT modulation is a multi-carrier technique that partially addresses the drawbacks of the CAP, DMT and DWMT modulation techniques. In general terms, the FMT modulation is achieved by splitting the data into several streams, each of them applied to one of the inputs of a filter-bank where the filters are frequency-shifted versions of a prototype filter that achieves a high level of spectral containment, such that intersymbol interference (ISI) is negligible compared to other noise signals. Because of implementation complexity, the number of subchannels is considerably less than in DMT. An implementation of an FMT scheme will be described herebelow in detail.

FIG. 1 shows a block-diagram of a VDSL system employing a filter-bank modulation and demodulation concepts (see, for example, G Cherubini, et al., "Filtered Multi-tone Modulation for Very High-Speed Digital Subscribe Lines", *IEEE Journal on Selected Areas in Communications*, 2002, V. 20, N. 5, P. 1016-1028).

Accordingly, a group of M modulation symbols $A_k^{(i)}$, i=0, 1, ..., M−1 are provided in parallel at the rate of 1/T to a set of M filters 105 with transfer functions $H(e^{j2\pi f})$, and impulse response h(k). The efficient realization can be achieved in the critically sampled case (i.e., M=K)), when the filters 105 are selected as the frequency-shifted versions of a baseband filter, (referred to as a prototype filter). The notation ↑ K indicates upsampling by a factor of K by means of up-samplers 106, i.e., insertion of K−1 zeros between two consecutive input signals. The set of M filters 105 represents a so-called synthesis filter-bank 107. The filter-bank 107 generates a transmitted signal at the transmission rate of K/T. An output of each baseband prototype filter 105 is connected to a corresponding up-converter 110 that shifts a baseband spectrum of this filter in frequency to the corresponding subcarriers.

A transmitted FMT line signal $X_n$ is formed by summing output signals of all M up-converters 110 by an adder 112. The transmitted signal $X_n$ is transferred through a communication channel (cable) 115 with the frequency response C(f). An arrived signal $Y_n$ passed through the cable 115 is fed to M down-converters 117. Each of them shifts a signal of the corresponding subchannel to the baseband, and provides the shifted signal to an input of the corresponding Equalizer (EQ$_i$) 119 configured for eliminating intersymbol interference (ISI) within the subchannel. For each subchannel, a signal provided by an output of the Equalizer 119 passes to a corresponding analysis prototype filter 121 with the frequency response G(f). An analysis filter-bank 123 constituted by M filters 121 is followed by down-samplers 125. The notation ↓ K indicates down-sampling by a factor of K by means of the down-samplers 125.

Preferably, characteristics of the filter-banks 107 and 123 are chosen to satisfy a "perfect reconstruction" constraint, in order to ensure that transmission is free of intersymbol interference (ISI) and interchannel interference (ICI). In particular, a matched filtering, i.e., G(f)=H*(f) should be fulfilled for the "perfect reconstruction" of the received signal. (Hereinafter the symbol "*" denotes complex conjugation). The following orthogonal conditions are imposed for the design of the filter banks for the "perfect reconstruction" of the received signal:

$$\sum_n h_{(i)}(n) h_{(i)}^*(n - kM) = \delta_k, \quad i = 0, 1, \ldots, M - 1 \quad (1)$$

$$\sum_n h_{(i)}(n) h_{(j)}^*(n - kM) = 0, \quad i \neq j$$

where δ denotes the Kronecker symbol. The elements of a set of orthogonal filter impulse responses that satisfy Eq. (1) are referred to as wavelets.

The form of the prototype wavelet is very impotent for its spectral characteristics and very critical for the performance of the multi-carrier system (see, for example, U.S. Pat. No. 6,278,686 to Michel Alard). FIG. 2 illustrates an example of a prototype wavelet 201, which can be generated by a baseband prototype filter. In turn, FIG. 3 illustrates a spectrum 301 of the prototype wavelet 201.

Because the transmission channel is not ideal, the orthogonality between subchannels is destroyed at the receiver whenever amplitude and phase distortions are introduced by the transmission medium. In order to maintain orthogonality, various modulation techniques utilize various approaches. For example, DMT modulation systems extend cyclically each block of M transmit symbols prior to transmission. On the other hand, FMT technique employs another approach, whereby spectral overlap between the subchannels is avoided. FIG. 4 shows a typical example of the transmission spectrum of a VDSL system employing FMT modulation and demodulation scheme described above.

The key advantages of application of the FMT modulation to xDSL, when compared to other types of aforementioned modulation techniques, can be summarized as follows. FMT provides a flexibility to adapt to a variety of spectrum plans for allocating bandwidth for upstream and downstream transmissions. FMT modulation allows a high-level of subchannel spectral containment, and thereby avoids disturbance by echo and self-NEXT (near-end crosstalk). Furthermore, disturbance by a narrowband interferer, e.g., from AM or HAM radio sources, does not affect neighboring subchannels as the side lobe filter characteristics are significantly attenuated. Likewise, FMT modulation does not require synchronization of the transmissions at both ends of a link or at the binder level, as is needed for DMT xDSL. Finally, there is no need for cyclic extensions in the form of cyclic prefix or suffix.

A main disadvantage of the prior art FMT modulation scheme is associated with its complexity and significant difficulty of its implementation. For example, the synthesis filter-bank of the 64 subchannels VDSL system employing FMT modulation (hereinafter FMT VDSL system) includes 64 FIR filters, each of them having 128 taps. In turn, an FMT receiver for such a system must comprise not only 64 FIR filters of the analyses filter bank, but also 64 equalizers. In turn, each of the equalizers must be adaptive and comprise minimum 32 changeable parameters. Moreover, FMT system has to include 64 up-converters and 64 down-converters. Therefore, notwithstanding the good theoretical results, the FMT modulation for the VDSL was not yet realized on a mass scale.

SUMMARY OF THE INVENTION

Despite the prior art in the area of FMT modulation technique, there is still a need in the art for, and it would be useful to have, a novel FMT modulation scheme for transmission and reception of multicarrier data signals over wired or wireless communication line. It would be advantageous to optimize the synthesis and analysis filter banks for a feasible realization of the FMT multi-carrier modulation for a high-speed data transmission.

The present invention partially eliminates disadvantages of the prior art FMT modulation and provides a new implementation scheme which enables to realize in practically an FMT multi-carrier transceiver for a high-speed data transmission over communication line.

The present invention provides a method for transmission of information data over a communication line, e.g., a pair of copper wires. At the transmitting end, the method includes obtaining the information data, providing a sequence of sub-channel non-overlapped wavelets, and modulating the sequence of the sub-channel wavelets by the information data, and overlapping the modulated sub-channels wavelets. As a result of the overlapping, a multicarrier signal carrying the information data is generated. The multicarrier signal is provided to the communication line for transmitting therethrough. The multicarrier signal should be subjected to D/A converting before its transmission over the communication line.

According to the invention the generation of the sequence of the sub-channel non-overlapped wavelets is carried out by N-points Inverse Fast Fourier Transform (IFFT). Contrary to the prior art techniques, trying to optimize the FMT modulation by minimization of a bandwidth of the prototype wavelet generated by the prior art synthesis filter-bank, in the present invention, the optimization criteria are, inter alia, based on minimization of the synthesis and analysis complexities of the prototype wavelet. In accordance with the present invention, the prototype wavelet W(t) is artificially constructed as a sum of the minimal number of functions such that the wavelet would provide a minimal Inter Symbol Interference (ISI) and a minimal Inter Channel Interference (ICI). Accordingly, each wavelet is constructed as a sum of a predetermined number of functions such that the following conditions are fulfilled: (i) the wavelet is symmetrical and has a finite length, (ii) a spectrum of the wavelet does not include off-band components.

For example, such a wavelet can be constructed from cosine functions, $\cos(2\pi nt/T)$, were T is the length of the prototype wavelet and n is the natural number, to wit:

$$W(t) = \sum_{n=K_0}^{n=K_1} a_n \cos(2\pi nt/T);$$

A number N of the cosine functions, ($N=K_1-K_0$), needed for the construction of the optimal prototype wavelet, can be relatively low, e.g., less than 20.

As a result, the prior art filter-bank scheme shown in FIG. 1 can be optimized because such prototype wavelet may, for example, be synthesized by an inverse fast Fourier transform (IFFT) and analyzed by a fast Fourier transform (FFT) transform. In such a case, no more than about 20 points of the IFFT are needed for the synthesis of the prototype wavelet.

Accordingly, each of the subchannel wavelets may be constructed from the prototype wavelet by the corresponding shifting of the prototype wavelet spectrum. This means that up-converting of the subchannel signal may be provided by connection to the corresponding inputs of the large size IFFT.

Thus, according to the invention, the overlapping of the modulated prototype wavelets is carried out by shifting every IFFT cycle the data represented by N IFFT points for different modulated prototype wavelets with respect to each other on a predetermined number of IFFT points and summing every IFFT cycle the data signals corresponding to a predetermined number of the shifted modulated prototype wavelets. As a result of the overlapping, a multicarrier signal carrying said information data is generated.

At the receiving end, the method includes receiving a distorted multicarrier signal including a signal representing overlapped wavelets carrying the information data together with a noise signal provided by the communication line during the transmission and separating the overlapped wavelets by shifting the wavelets with respect to each other on a predetermined number of FFT points. As a result, a sequence of the wavelets carrying said information data distorted by a noise signal is provided. When required, the distorted multicarrier signal received after the transmission can be amplified before the separating of the overlapped wavelets.

Further, the method includes analyzing the sequence of the wavelets by using an N-points Fast Fourier Transform (FFT), thereby generating spectral frequency amplitudes of the wavelets. Thereafter, the spectral frequency amplitudes of the wavelets demodulated for providing the information data.

The demodulating of the spectral frequency amplitudes of the received wavelet includes generating information data D according to the equation $$D = \sum_{k=1}^{(K-1)/2+1} (\hat{a}_k + \tilde{a}_k)a_k + \hat{a}_0 a_0,$$

where $\hat{a}_k$ and $\tilde{a}_k$ are the spectral amplitudes of the received wavelet centered at the spectral amplitude $\hat{a}_0$; $a_k$ is an amplitude of k-th frequency component of an original prototype wavelet centered at $a_0$; and K is a number of the all frequency components in every wavelet.

When necessary, the method can comprising the step of equalizing the spectral frequency amplitudes of the wavelets before the demodulating step for eliminating phase-amplitude distortions of the distorted multicarrier signal. The equalizing of the spectral frequency components of the wavelets includes dividing the spectral frequency amplitudes of the wavelets by a frequency response of the communication line.

The present invention also satisfies the foregoing need by providing a transceiver system for transmission of information data over the communication line. Generally, the transceiver system comprises a transmitter and a receiver. According to the present invention, the transmitter includes a synthesis filter bank and an overlapping unit coupled to said synthesis filter bank and configured to provide an overlapped wavelet transmission signal in digital form. The transmitter includes a digital-to-amplitude (D/A) converter coupled to the overlapping unit and configured to produce an analog line signal which may be transmitted through a telephone cable or a radio channel. Moreover, when required, the transmitter can include a line driver coupled to the D/A converter configured for amplifying the multicarrier analog signal.

The synthesis filter bank is configured for obtaining the information data, generating a set of wavelets and modulating thereof. The synthesis filter bank includes at least one modulator having at least one multiplier configured for multiplying the information data, by amplitudes of frequency components of the corresponding wavelet, thereby modulating the amplitudes by the information data. The synthesis filter bank also includes an N-points IFFT unit coupled to an output terminal of the modulator. The N-points IFFT unit is configured for obtaining the modulated amplitudes of the frequency components of the wavelets and generating a set of the wavelets modulated by the information data.

The overlapping unit is configured for generating a multicarrier FMT signal carrying the information data and providing thereof to the communication line. The overlapping unit includes a parallel adder coupled to N output terminals of the IFFT unit and a shift register downstream of said parallel adder. The shift register is configured for shifting every IFFT cycle the data represented by N IFFT points for different modulated prototype wavelets with respect to each other on a predetermined number of IFFT points. The parallel adder is configured for summing every IFFT cycle the data signals corresponding to a predetermined number of the shifted modulated wavelets.

According to the present invention, the receiver includes an A/D converter unit, a separating unit coupled to the A/D converter unit and an analyzing filter bank coupled to the separating unit. Likewise, when required, the receiver can include an amplifier arranged before the A/D converter.

The A/D converter unit is configured to transform analog signals arrived from the telephone cable or radio channels into digital form. The separating unit is configured to separate the overlapped wavelets of the FMT line signal as will be described herebelow. The separating unit includes a separating shift register and a parallel register arranged downstream of said separating shift register. The separating shift register is configured for (i) obtaining a distorted multicarrier signal comprising overlapped wavelets carrying the information data together with a noise signal provided by the communication line during the transmission, and (ii) separating the overlapped wavelets by shifting the wavelets with respect to each other on a predetermined number of FFT points, thereby to provide a sequence of the wavelets carrying the information data. The parallel register is configured for storing the sequence of the wavelets carrying the information data provided by the separating shift register.

The analyzing filter bank is configured for obtaining the sequence of the wavelets and demodulating thereof, thereby to provide the information data. The analyzing filter bank includes an N-points FFT unit and a demodulator coupled to the N-points FFT unit. The N-points FFT unit is configured for obtaining the sequence of the wavelets from the parallel register and generating spectral frequency amplitudes of the wavelets. The demodulator is configured for obtaining the spectral frequency amplitudes of the wavelets and generating a signal representing the information data.

According to one embodiment of the invention, the demodulator includes at least one multiplier, at least one adder coupled to the multiplier a decision circuit coupled to the adder. The multiplier is configured for multiplying each of the spectral frequency amplitudes by a certain coefficient. The adder is configured for combining results of the multiplying for each wavelet. The decision circuit is configured for quantizing the data obtained therefrom. For example, the demodulator can generate information data D according to the equation $$D = \sum_{k=1}^{(K-1)/2+1} (\hat{a}_k + \tilde{a}_k)a_k + \hat{a}_0 a_0,$$

where $\hat{a}_k$ and $\tilde{a}_k$ are the spectral amplitudes of the received wavelet centered at the spectral amplitude $\hat{a}_0$; $a_k$ is an amplitude of k-th frequency component of an original prototype wavelet centered at $a_0$; and K is a number of the all frequency components in every wavelet.

When required, the receiver can include at least one equalizer configured for correcting amplitudes of spectral frequency components of the wavelets by a obtaining said spectral frequency amplitudes of the wavelets and eliminating phase-amplitude distortions of said distorted multicarrier signal received in the communication line. According to one embodiment of the invention, the equalizer includes at least one multiplier configured for multiplying said spectral frequency amplitudes of the wavelets by a frequency response of the communication line The advantages of the technique proposed in the present invention can be better understood from the following example of a wavelet FMT system having 50 sub-channels in which a 20-points IFFT transform is used for the wavelet synthesis for each sub-channel. In such a case, utilization of a 1024-points IFFT transform will be sufficient for the synthesis of the wavelets for all the 50 sub-channels of the FMT VDSL system. An FMT line signal provided at the output of an IFFT unit that results from a sum of all the 50 subchannels is transmitted through a communication line. After arriving to a receiver, the decoding of the received FMT line signal may be carried out by an IFFT transform of the same size as the size of the IFFT transform, i.e, 1024 points. Thus, in accordance with the present invention, the down-converters in all the 50 subchannels of the analysis filter-bank of the prior art system shown in FIG. 1 may be replaced by only a 1024-points FFT. Moreover, contrary to the prior art scheme, only one Equalizer utilizing rather simple algorithm is necessary at the FFT output, in accordance with the present invention.

Thus, according to one broad aspect of the invention, there is provided a method for transmission of information data over a communication line, the method comprising the following steps all carried out by a transmitter:
(a) obtaining said information data;
(b) providing a sequence of subchannel non-overlapped wavelets by using N-points Inverse Fast Fourier Transform (IFFT), each wavelet being constructed as a sum of a predetermined number of functions such that the following conditions are fulfilled:
  (i) the wavelet is symmetrical and has a finite length,
  (ii) a spectrum of the wavelet does not include off-band components;
(c) modulating said sequence of said subchannel non-overlapped wavelets by said information data;
(d) overlapping the modulated subchannel non-overlapped wavelets by shifting every IFFT cycle the data represented by N IFFT points for different modulated prototype wavelets with respect to each other on a predetermined number of IFFT points and summing every IFFT cycle the data signals corresponding to a predetermined number of the shifted modulated prototype wavelets, thereby generating a multicarrier signal carrying said information data;

(e) providing every IFFT cycle said multicarrier signal to said communication line for transmitting therethrough.

According to another broad aspect of the invention, there is provided a method for transmission of information data over a communication line, the method comprising the following steps all carried out by a receiver:

(a) receiving a distorted multicarrier signal including a signal representing overlapped wavelets carrying said information data together with a noise signal provided by said communication line during the transmission;

(b) separating said overlapped wavelets by shifting the wavelets with respect to each other on a predetermined number of FFT points, thereby providing a sequence of the wavelets carrying said information data distorted by a noise signal;

(c) analyzing said sequence of the wavelets by using an N-points Fast Fourier Transform (FFT), thereby generating spectral frequency amplitudes of wavelet components;

(d) demodulating said spectral frequency amplitudes of the wavelet components, thereby to provide the information data.

According to a further broad aspect of the invention, there is provided a transmitter for use with a multicarrier transceiver system for transmission of information data over a communication line, the transmitter comprising:

(a) a synthesis filter bank configured for obtaining said information data, generating a set of wavelets and modulating thereof, said synthesis filter bank includes:

at least one modulator having at least one multiplier configured for multiplying the information data, by amplitudes of frequency components of the corresponding wavelets, thereby modulating said amplitudes by the information data; and an N-points IFFT unit coupled to the modulator, said N-points IFFT unit being configured for obtaining the modulated amplitudes of the frequency components of the wavelets and generating a set of the wavelets modulated by the information data;

(b) an overlapping unit coupled to said synthesis filter bank configured for generating a multicarrier signal carrying said information data and providing thereof to the communication line, said overlapping unit includes a parallel adder coupled to N output terminals of the IFFT unit and a shift register downstream of said parallel adder, said shift register being configured for shifting every IFFT cycle the data represented by N IFFT points for different modulated prototype wavelets with respect to each other on a predetermined number of IFFT points, said parallel adder being configured for summing every IFFT cycle the data signals corresponding to a predetermined number of the shifted modulated wavelets.

According to still another broad aspect of the invention, there is provided a receiver for use with a multicarrier transceiver system for transmission of information data over a communication line, the receiver comprising:

(a) a separating unit including:

(i) a separating shift register configured for obtaining a distorted multicarrier signal comprising overlapped wavelets carrying said information data together with a noise signal provided by said communication line during the transmission, and separating said overlapped wavelets by shifting the wavelets with respect to each other on a predetermined number of FFT points, thereby providing a sequence of the wavelets carrying said information data; and (ii) a parallel register arranged downstream of said separating shift register and configured for storing the sequence of the wavelets provided by the separating shift register;

(b) an analyzing filter bank downstream of the separating unit configured for obtaining said sequence of the wavelets and demodulating thereof, thereby to provide said information data, said analyzing filter bank includes:

(i) an N-points FFT unit configured for obtaining said sequence of the wavelets from the parallel register and generating spectral frequency amplitudes of the wavelets; and (ii) a demodulator coupled to said N-points FFT unit and configured for obtaining said spectral frequency amplitudes of the wavelets and generating a signal representing said information data.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

In order to understand the invention and to see how it may be carried out in practice, preferred embodiments will now be described, by way of non-limiting examples only, with reference to the accompanying drawings, in which:

FIG. 17 illustrates a schematic block diagram of a synthesis filter-bank, in accordance with another embodiment of the present invention;

FIG. 18 illustrates an exemplary spectrum of the multicarrier line signal generated by the synthesis filter-bank of FIG. 17;

FIGS. 19A and 19B illustrate exemplary signals generated by the IFFT unit and the shift register, respectively, for the case of L=6;

DETAILED DESCRIPTION OF THE INVENTION

Figure 1:
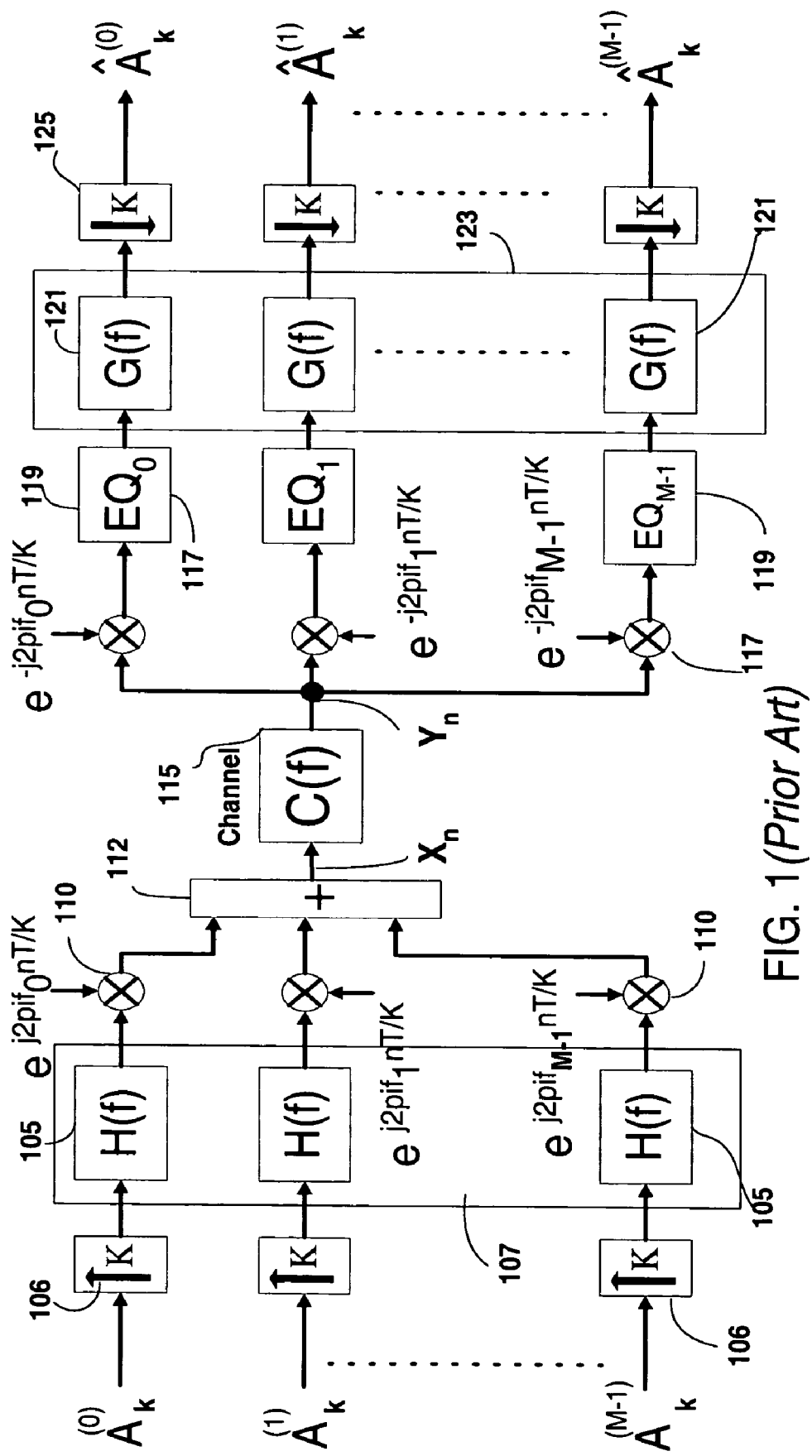
FIG. 1 is a block-diagram of a VDSL system employing filter-bank modulation and demodulation concepts.
Figure 2:
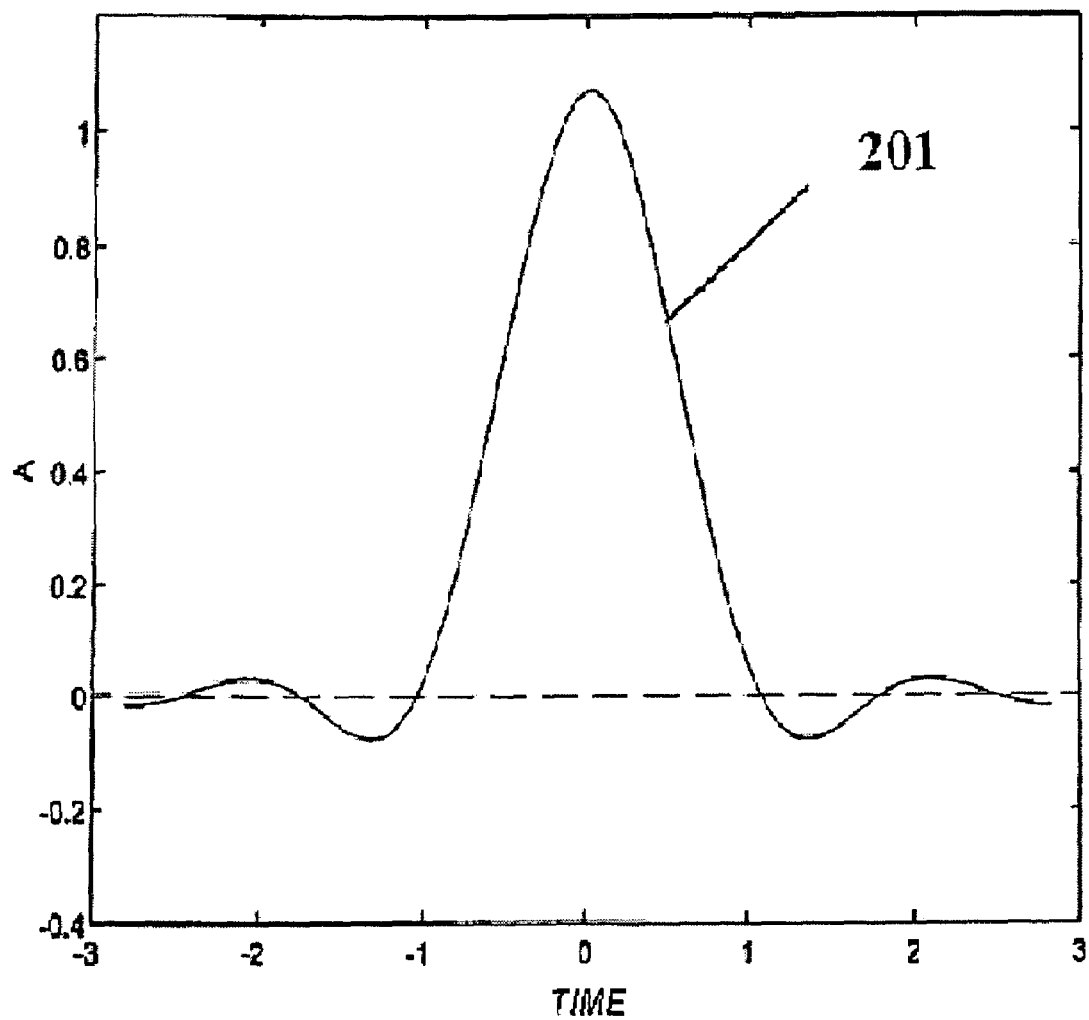
FIG. 2 illustrates an example of a prototype wavelet and its spectrum.
Figure 3:
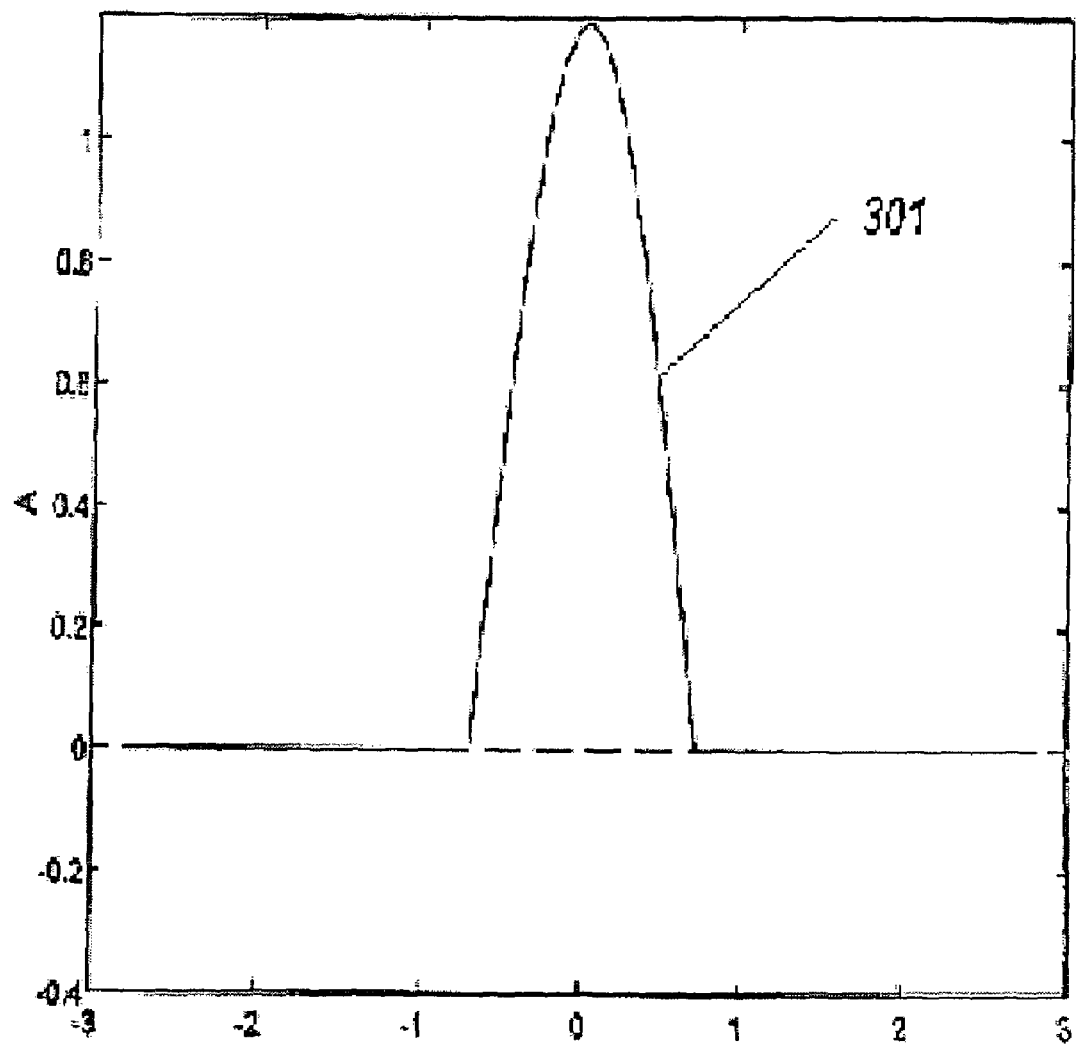
FIG. 3 illustrates a spectrum of the exemplary prototype wavelet shown in FIG. 2.
Figure 4:
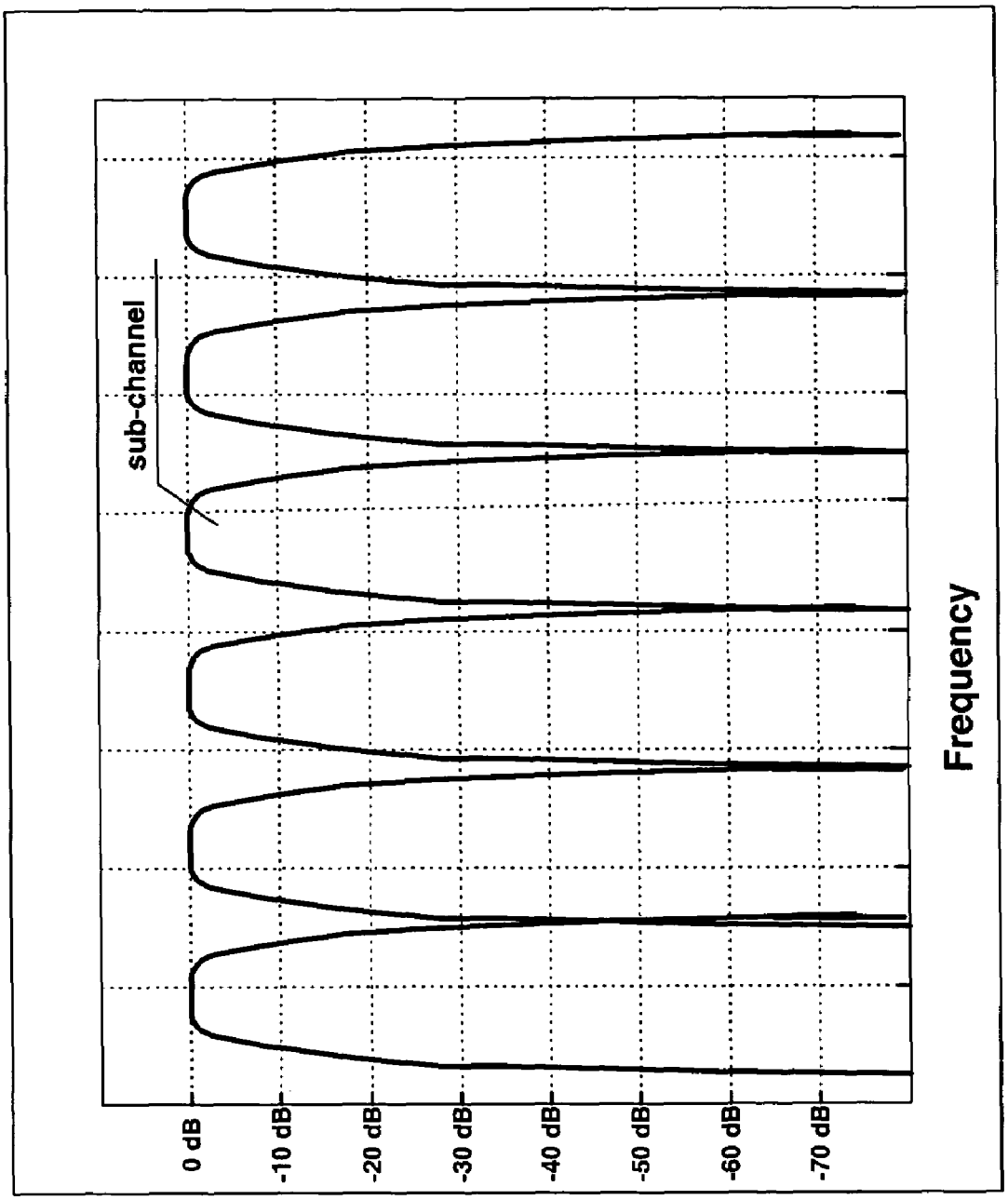
FIG. 4 illustrates a transmission spectrum of a VDSL system employing filter-bank modulation and demodulation concepts.

The principles and operation of the process and system according to the present invention may be better understood with reference to the drawings and the accompanying description, wherein like reference numerals have been used throughout to designate identical elements, where it is convenient for description. It is understood that these drawings are given for illustrative purposes only and are not meant to be limiting. It should be noted that the blocks in the drawings illustrating various embodiments of the system of the present invention are intended as functional entities only, such that the functional relationships between the entities are shown, rather than any physical connections and/or physical relationships.

Some portions of the detailed descriptions, which follow hereinbelow, are presented in terms of algorithms and symbolic representations of operations on data represented as physical quantities within registers and memories of a computer system. An algorithm is here conceived to be a sequence of steps requiring physical manipulations of physical quantities and leading to a desired result. Usually, although not necessarily, these quantities take the form of electrical or magnetic signals capable of being stored, transferred, combined, compared, and otherwise manipulated. In the present description, these signals will be referred to as values, elements, symbols, terms, numbers, or the like. Unless specifically stated otherwise, throughout the description, utilizing terms such as "processing" or "computing" or "calculating" or "determining" or the like, refer to the action and processes of a computer system, or similar electronic computing device, that manipulates and transforms data.

Figure 5:
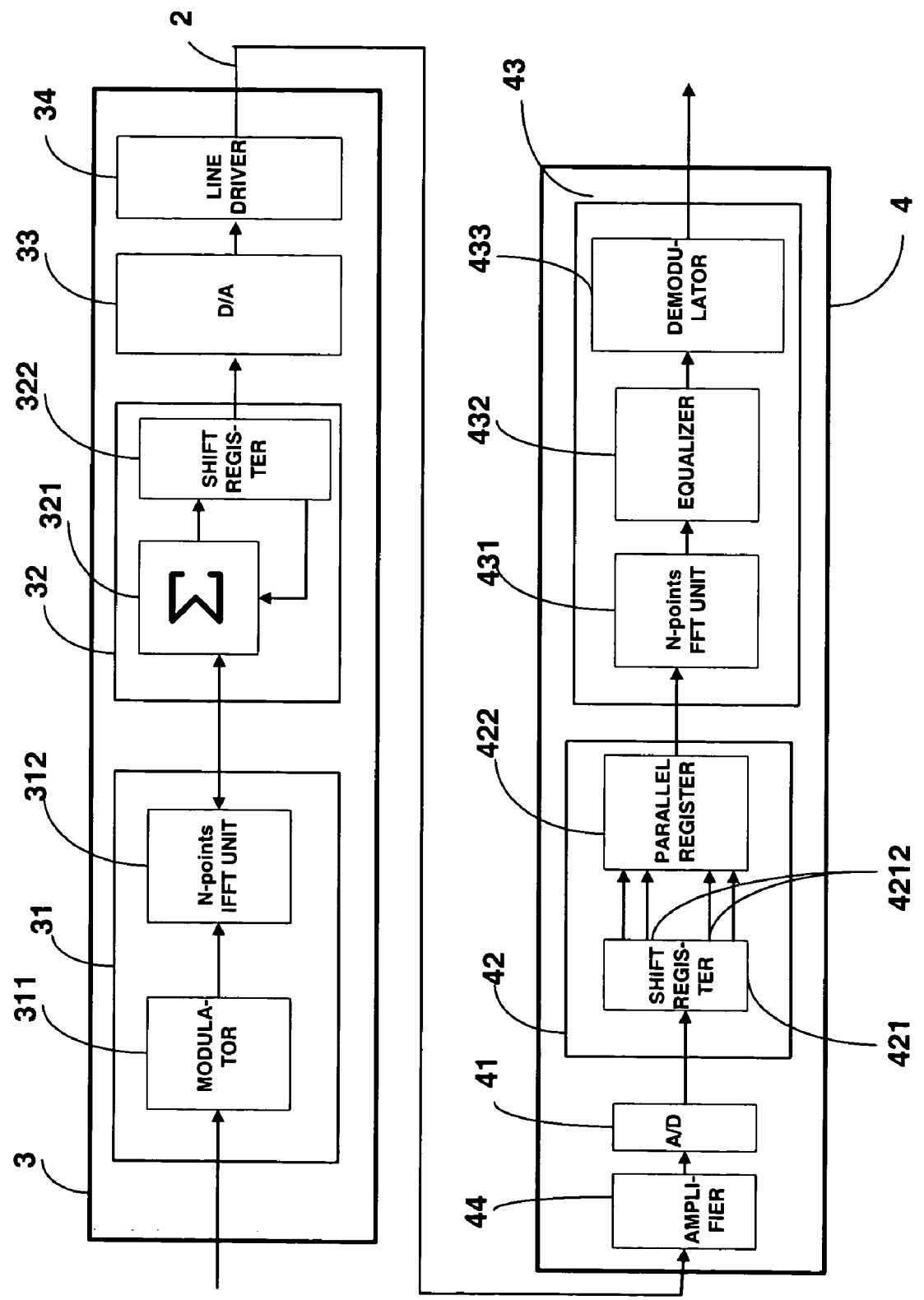
FIG. 5 illustrates a schematic block diagram of a multicarrier transceiver system of the present invention for transmission of a data signal over a communication line.

Referring to FIG. 5, a schematic block diagram of a multicarrier transceiver system 1 for transmission of an information data signal over a communication line (channel) 2 is illustrated, in accordance with the present invention. The transceiver system 1 comprises a transmitter 3 and a receiver 4. The transmitter 3 includes a synthesis filter bank 31 and an overlapping unit 32 coupled to the synthesis filter bank 31. The transmitter also includes a digital-to-analog (D/A) converter 33 coupled to the overlapping unit 32 and, when required, a line driver (amplifier) 34 arranged after the D/A converter 33 and coupled to the communication line 2.

The synthesis filter bank 31 is configured for obtaining information data and generating a set of "non-overlapped" wavelets and modulating the wavelets by the information data. The overlapping unit 32 is configured for (i) obtaining a sequence of the non-overlapped wavelets, (ii) generating a multi-carrier signal comprising overlapped wavelets carrying the information data and (iii) providing this FMT multi-carrier signal to the communication line 2.

More specifically, the synthesis filter bank 31 includes at least one modulator 311 and an N-points IFFT unit 312 coupled to the modulator 311. The modulator 311 is configured for obtaining input stream of the information data, providing amplitudes of K frequency components of a corresponding subchannel wavelet (i.e., wavelet coefficients) and modulating the wavelet coefficients by the input information data.

The present invention provides a modulation scheme (herein referred to as wavelet FMT (WFMT)) minimizing the synthesis and analysis complexities of the prototype wavelet generated by the prior art filter banks described above. In accordance with the present invention, the prototype wavelet W(t) is artificially constructed as a sum of the minimal number of functions such that the wavelet would provide a minimal Inter Symbol Interference (ISI) and a minimal Inter Channel Interference (ICI). The following main criteria are selected for construction of the prototype wavelet, according to the invention.

A. The prototype wavelet must be of a finite length. This condition is imposed on the prototype wavelet for minimization of ISI B. The prototype wavelet spectrum should not comprise off-band components. This condition is imposed on the prototype wavelet for minimization of ICI.

C. The prototype wavelet should be symmetrical.

According to one embodiment of the invention, a function utilized as a prototype wavelet can be composed as a sum of cosine functions, $$W(t) = \sum_{n=1}^{n=K} a_n \cos(2\pi nt/T), \quad (1)$$

were T is the length of the prototype wavelet and n is the natural number counting the frequency components (n=1, 2, ..., K), K is the number of the frequency components and $a_n$ is the amplitude of n-th frequency component of the wavelet.

In such a case, for a baseband prototype wavelet, which spectrum is centered at zero frequency, the prototype wavelet can be presented by:

$$W(t) = \sum_{i=-(K-1)/2}^{i=(K-1)/2} a_{(|i|)} \cos(2\pi i/T). \quad (2)$$

It should be appreciated from Eq. (2) that according to this embodiment of the invention only (K−1)/2+1 amplitudes $a_{(i)}$ should be defined. Accordingly, a bandwidth of the baseband wavelet can be obtained by:

$$\Delta F = -F_1 + F_2 = -(-K/2T) + K/2T = K/T. \quad (3)$$

The number of the frequency components required for the purpose of the invention can be determined on the basis of requirements for ISI minimization. It should be noted that the minimum value of ICI can be guarantied in the case of absence of off-band components.

Figure 6:
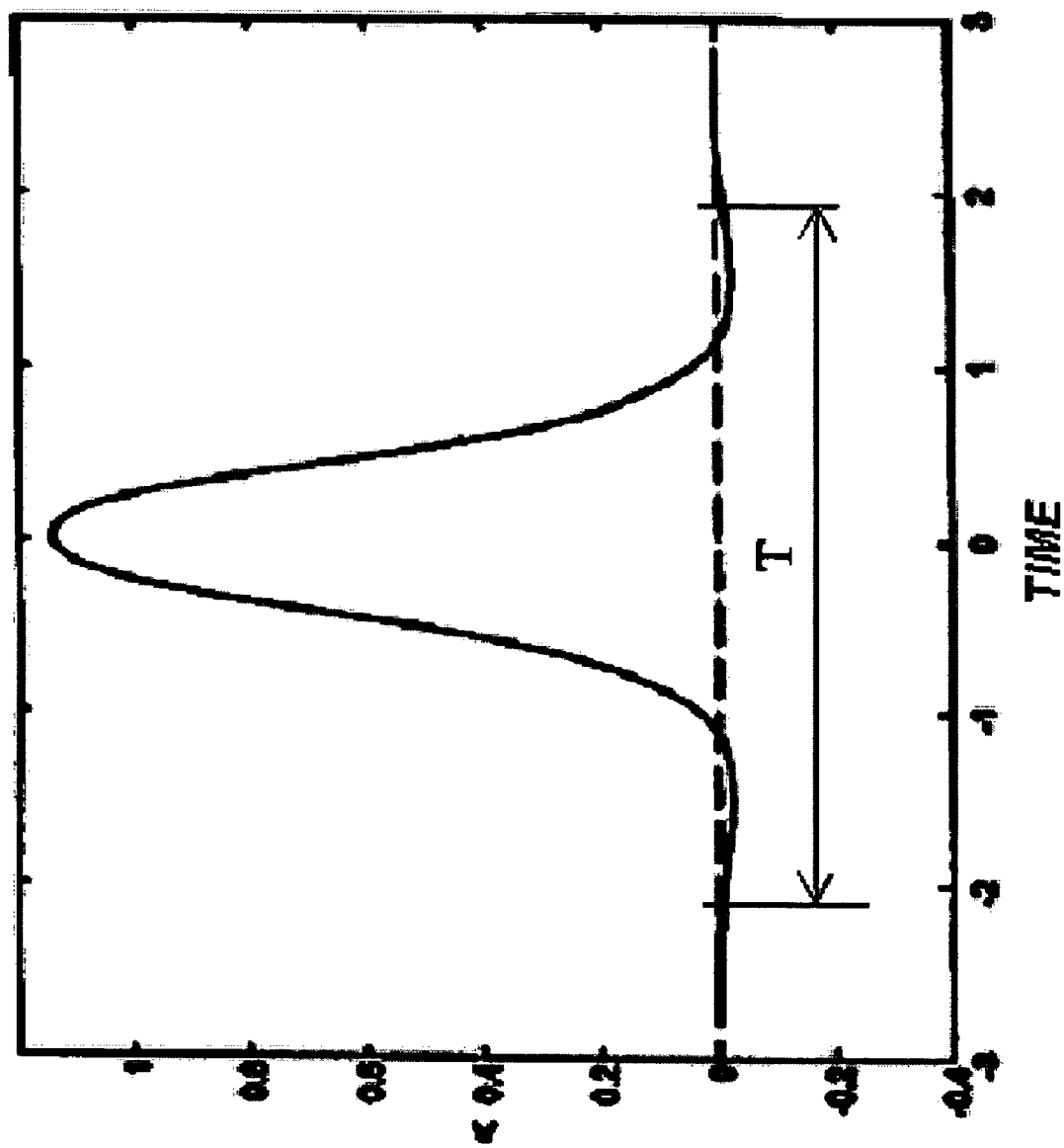
FIG. 6 illustrates an exemplary synthesized prototype wavelet with L=4.

Referring to FIG. 6, an example of a prototype wavelet is illustrative for the case when a number L of the overlapped wavelets that must be orthogonal (hereinafter the "overlapping coefficient") equals 4. It should be noted that the manner of the overlapping of the wavelets according to the invention will be described further below. For the case L=4, a minimum value of ISI will be guarantied when an autocorrelation function V(t) of the prototype wavelet satisfies the following conditions:

$$V(t)=0, \ t=-T/2, \ -T/4, \ T/4, \ T/2;$$

$$V(t)=1, \ t=0.$$

Figure 7:
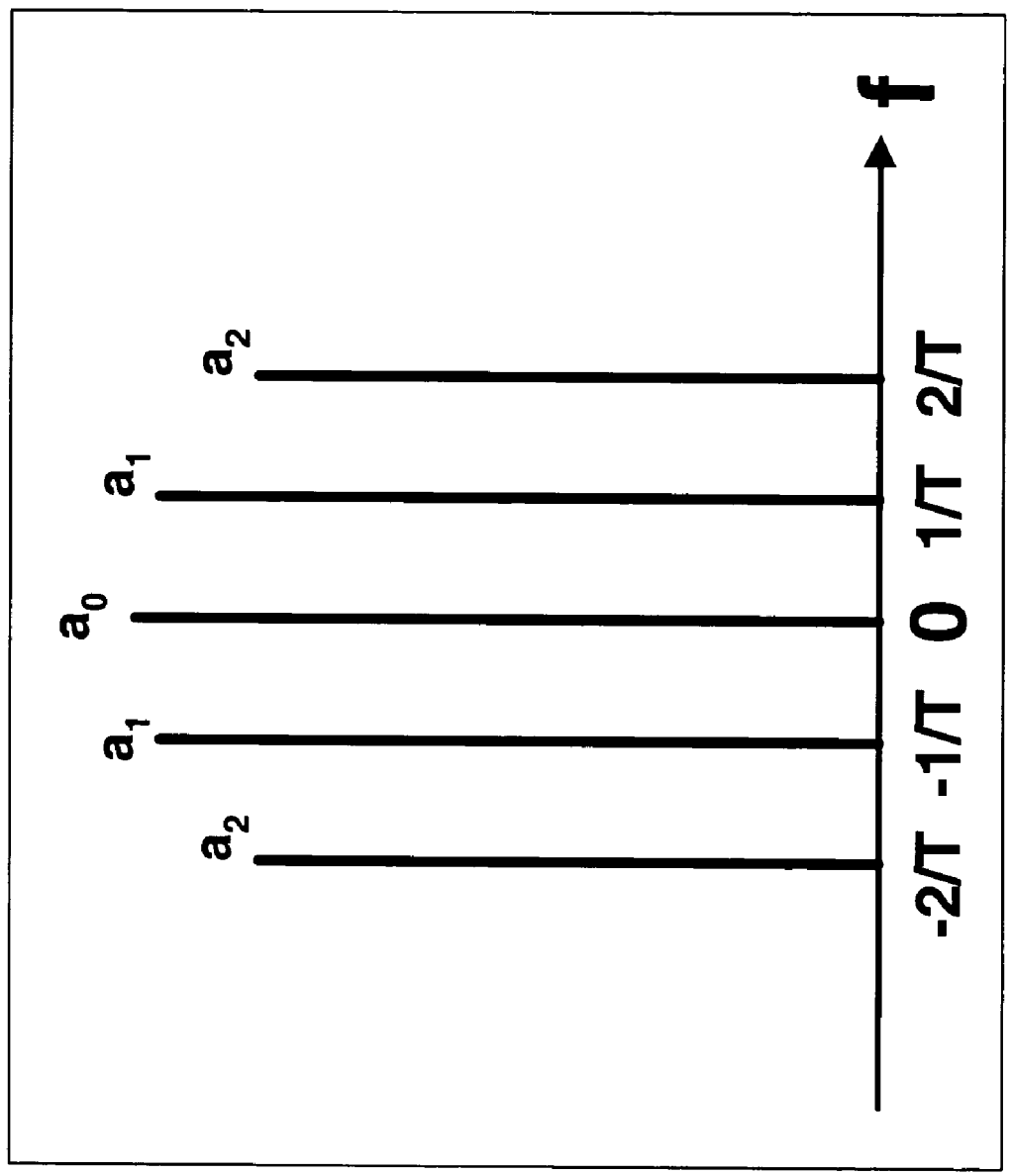
FIG. 7 illustrates a spectrum of the prototype wavelet shown in FIG. 6.

A spectrum of this prototype wavelet (for the case when L=4) is shown in FIG. 7. It should be appreciated that this spectrum has to include at least L frequency components corresponding to a critically sampled filter-bank structure (see, for example, an ITU contribution "Filtered Multitone Modulation", Geneva, 21 Jun.-2 Jul., 1999).

For example, a construction of an optimal prototype wavelet corresponding to a required magnitude of ICI can be realized by the following method.

In the beginning, the number of the frequency components K can be obtained. For instance, the value of the overlapping coefficient L (or a bigger value) can be assigned to the number of the frequency components, i.e., $K \geq L$. Thereafter, a magnitude of the least-square error S of the wavelet's orthogonality is calculated.

It should be appreciated that for the above example, when L=4, the least-square error can be obtained by:

$$S = \sqrt{(V(-T/2)^2 + V(-T/4)^2 + V(T/4)^2 + V(T/2)^2)}. \quad (4)$$

For obtaining a minimum value of ISI, the least-square error of orthogonality S should be minimized. The minimization of S can, inter alia, be carried out by means of varying (tuning) the amplitudes $a_{(i)}$ of the K cosine wavelet components.

Thus, if the magnitude of S is greater than that corresponding to the required ISI, then the number of frequency components K should be increased, e.g., K=K+1. In such a case a new least-square error should be minimized by tuning $a_{(i)}$ and evaluated with respect to the ISI value. The calculations can be repeated as long as required to obtain the required ISI value.

Examples of the magnitudes of the amplitudes $a_{(i)}$ obtained in accordance with the method described above for the case when K=11 are presented in Table 1.

The synthesized wavelet will have a bandwidth $\Delta F$ defined by $\Delta F = K/T$, that can be wider than the bandwidth of the critical sampled wavelet $\Delta F_0 = L/T$. A coefficient of the bandwidth extension $\alpha = \Delta F / \Delta F_0$ depends on the overlapping coefficient L.

Figure 8:
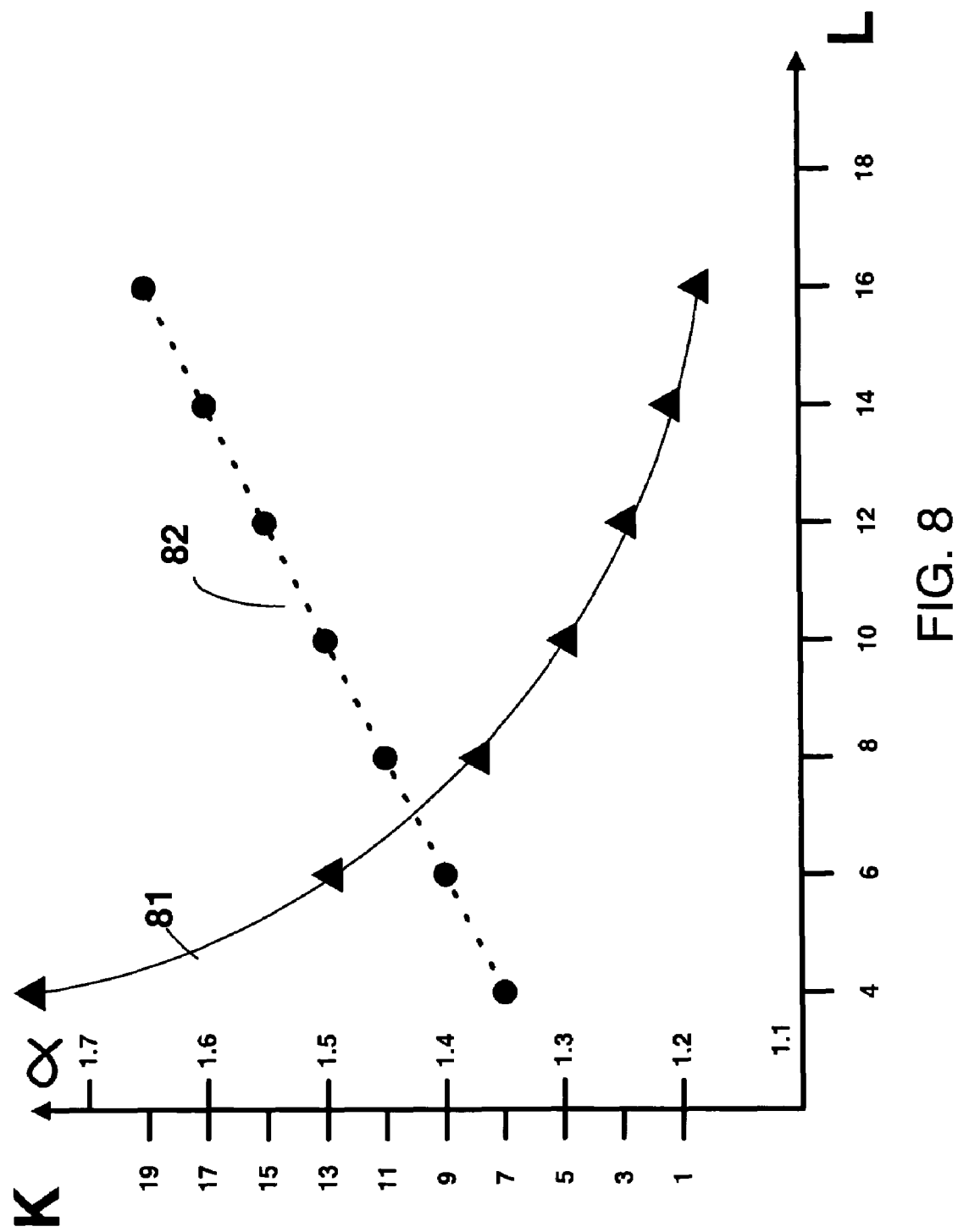
FIG. 8 illustrates a relationship between the number of frequency components, the bandwidth extension coefficient of the prototype wavelet and the overlapping coefficient.

FIG. 8 shows a relationship between K, $\alpha$ and L. As can be understood, the coefficient bandwidth extension $\alpha$ decreases as a function of the overlapping coefficient L (see curve 81). In turn, the number of the frequency components K increases when L increases (see curve 82). In practical implementations of the WFMT scheme of the present invention, it can be desirable for certain applications that the coefficient $\alpha$ would not be greater than the corresponded parameter for VDSL, i.e., $\alpha \leq 1.25$. Thus, as can be seen in FIG. 8, the value of $\alpha = 1.18$ can, for example, be achieved for the wavelet with the overlapping coefficient L=16. Accordingly, this value of $\alpha$ can be provided by a wavelet represented by a sum of 19 cosine functions (i.e., K=19).

It should be understood that the amplitudes $a_{(i)}$ can be calculated once in accordance with the described above method and stored in a memory unit (not shown in FIG. 5) of the transmitter and receiver, e.g., in the form of look-up tables. When required, to synthesize a wavelet, the corresponding amplitude magnitudes can be retrieved from the memory and utilized in a synthesis filter-bank, as will be described hereinbelow.

According to one aspect of the present invention, there are provided a new synthesis filter-bank and a method for synthesizing a prototype wavelet described above. Preferably, this prototype wavelet is composed of a sum of cosine functions in accordance with Eq. (1).

Figure 9:
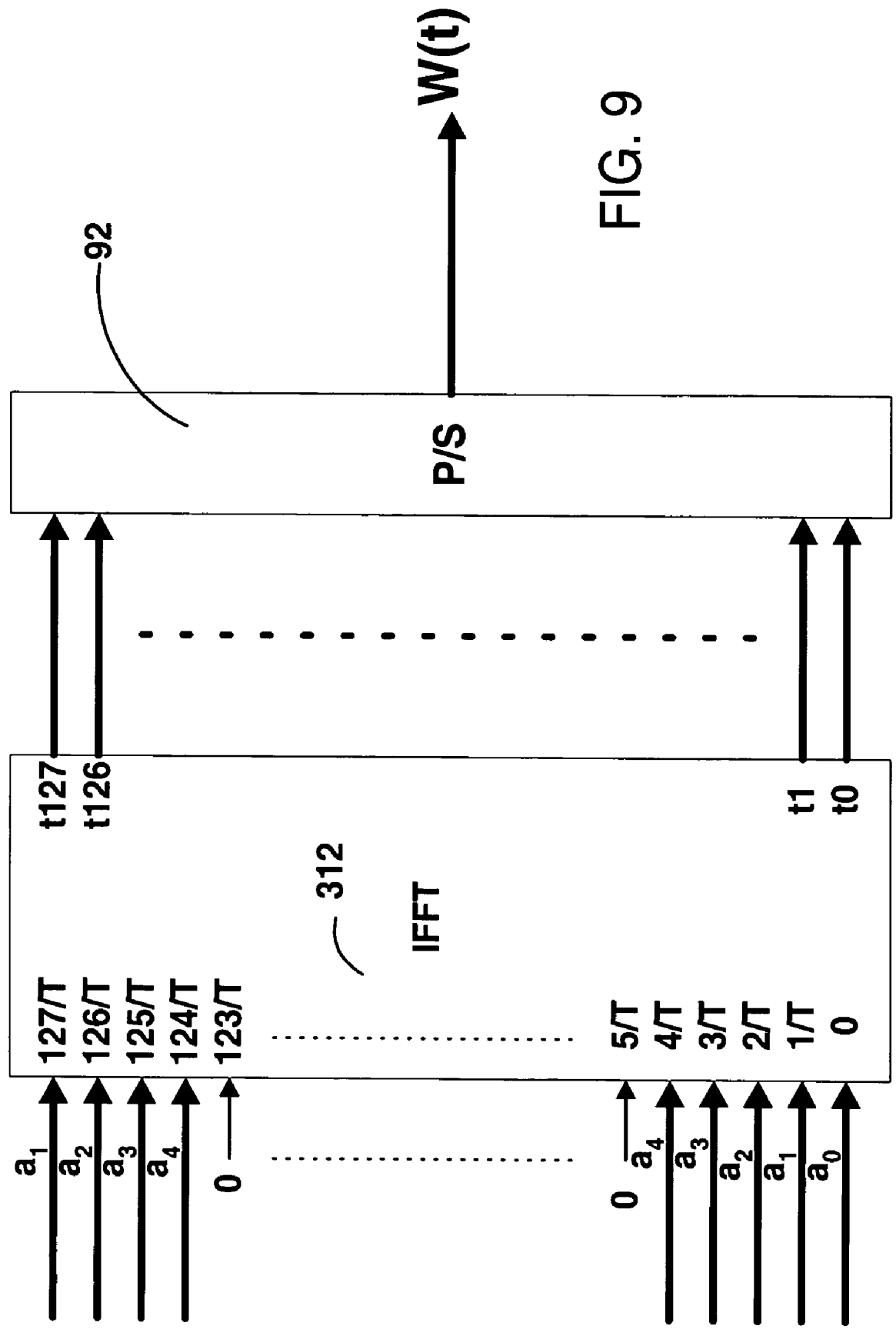
FIG. 9 illustrates an exemplary scheme for synthesis of a baseband prototype wavelet, in accordance with the present invention.

Referring to FIG. 9, an exemplary scheme for synthesis of a baseband prototype wavelet is illustrated, in accordance with the present invention. The scheme employs the IFFT, unit 312 and a Parallel-to-Serial Converter (P/S) 92. Although a 128-points IFFT unit is used in the example shown in FIG. 9, in general, an IFFT unit of any size can be used for the purpose of the invention, provided that the number of the IFFT points must be greater than 2K. For example, the IFFT points from 0 to 63 are used for positive frequency components of the Wavelet, while the points from 64 to 127 are representing negative frequency components of the Wavelet.

Figure 10B:
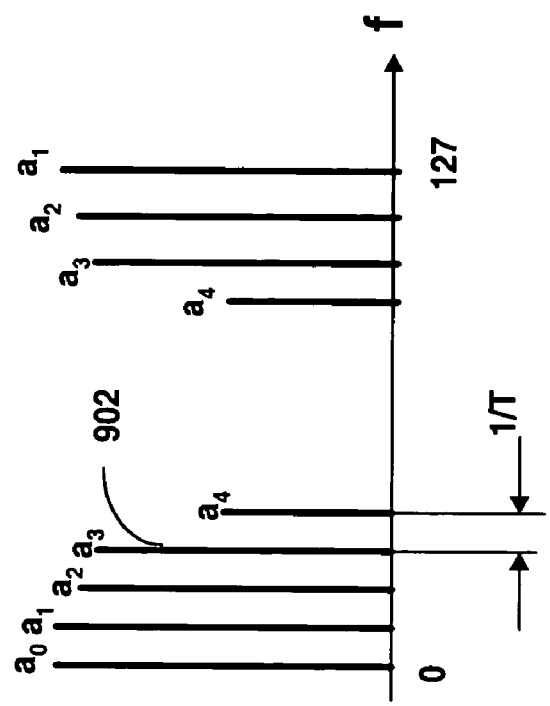
FIGS. 10A and 10B illustrate examples of a baseband prototype wavelet and its spectrum, respectively.
Figure 10A:
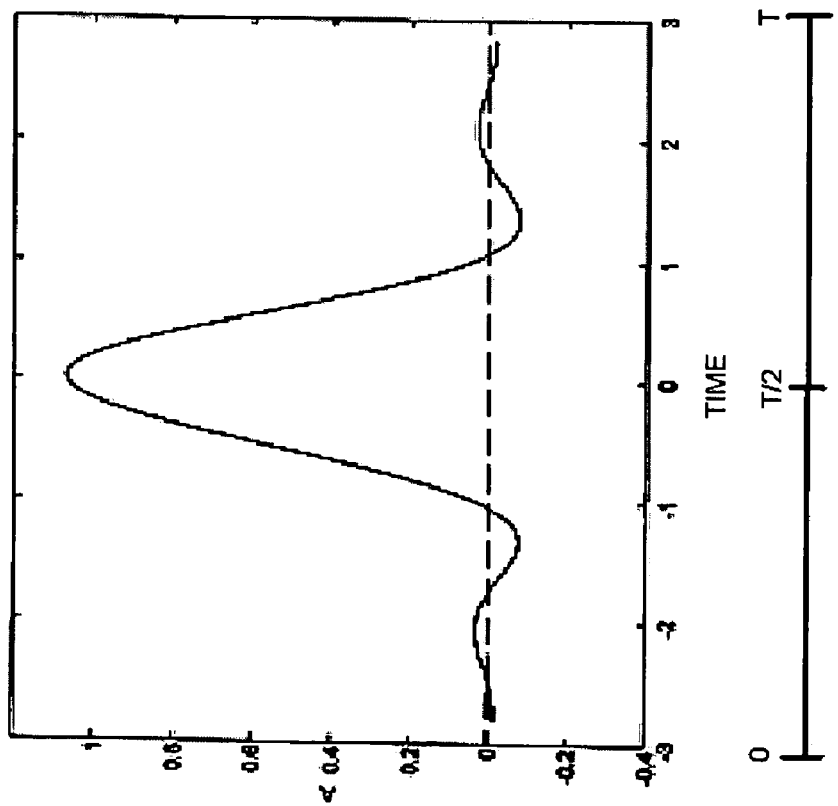

An example of a baseband prototype wavelet 901 that can be obtained by the scheme described in FIG. 9 and a wavelet's spectrum 902 are shown in FIGS. 10A and 10B, respectively. According to this example, the baseband prototype wavelet 901 comprises 9 cosine functions (i.e., K=9) with amplitudes $a_4$, $a_3$, $a_2$, $a_1$, $a_0$, $a_1$, $a_2$, $a_3$, $a_4$. The DC component of the wavelet 901 can have the amplitude $a_0$, and the wavelets spectrum 902 can be centered at this component.

According to the example shown in FIG. 9, only 9 inputs of the IFFT unit 312 are used for the synthesis of a baseband prototype wavelet. Each of the inputs of the IFFT unit 312 receives a corresponding $a_i$ value that was prepared in advance and stored in a memory unit (not shown). All others inputs of the IFFT receive a zero signal. An output of the IFFT unit 312 is fed to the Parallel/Serial Converter 92 that generates the baseband prototype wavelet 901.

TABLE 1

| $a_{(i)}$ | $a_0$ | $a_1$ | $a_2$ | $a_3$ | $a_4$ | $a_5$ | ICI |
|---|---|---|---|---|---|---|---|
| magnitude | 0.3539 | 0.3538 | 0.3533 | 0.3442 | 0.2496 | 0.0811 | >−45 dB |

Figure 11:
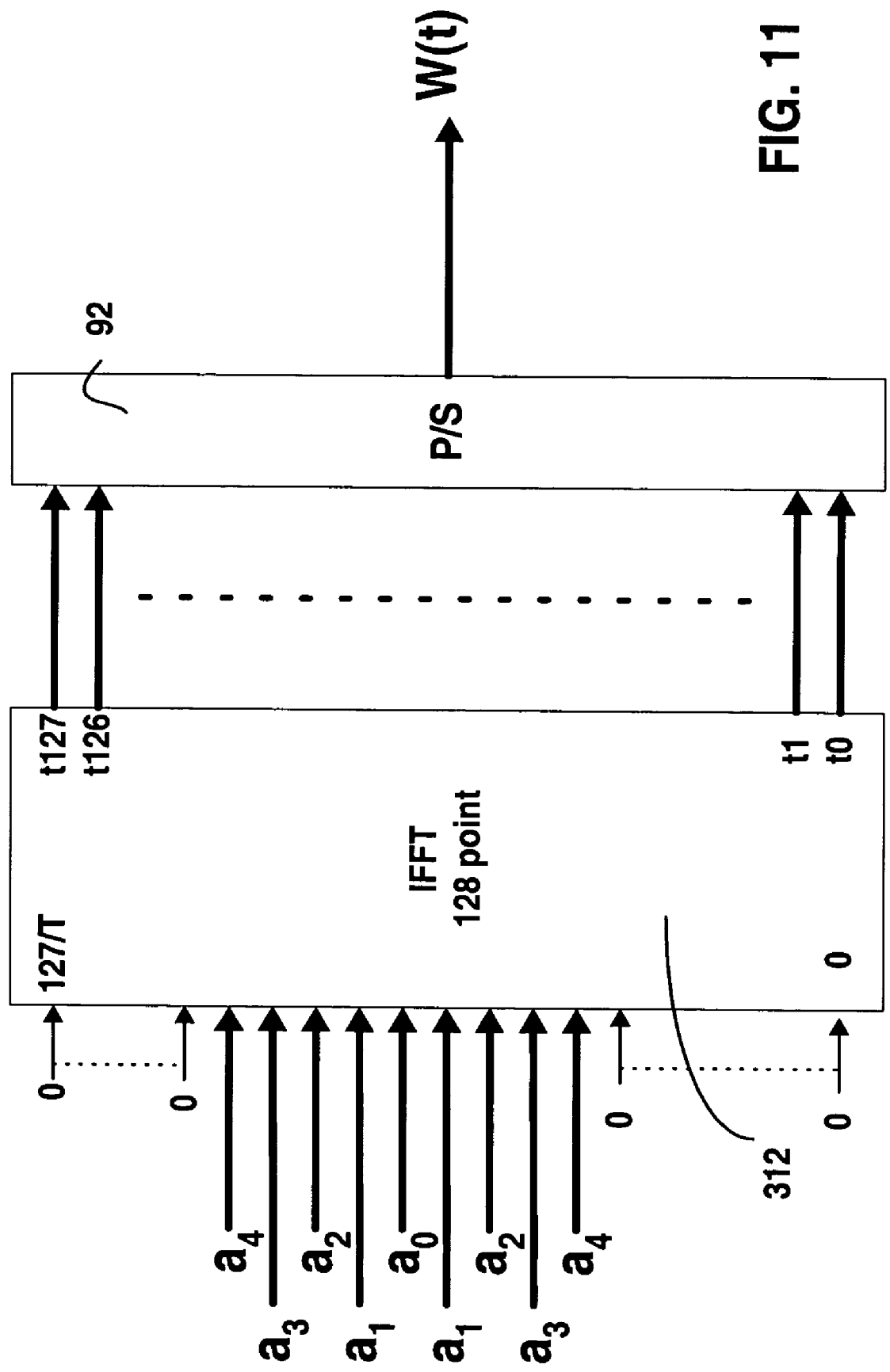
FIG. 11 illustrates an exemplary scheme for synthesis of a subchannel wavelet, in accordance with one embodiment of the present invention.
Figure 12A:
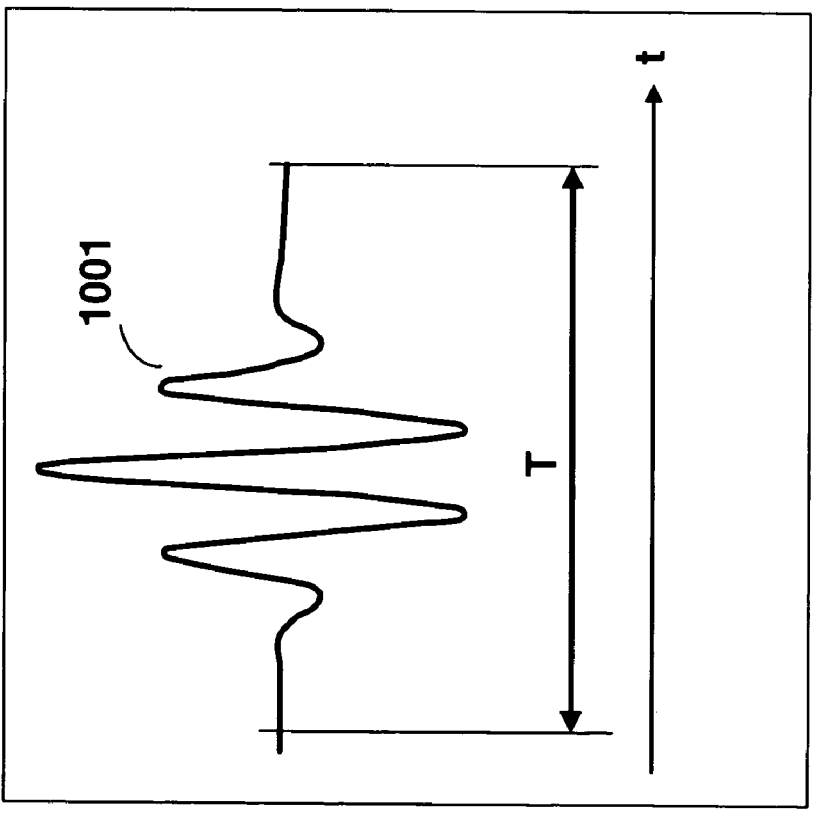
FIGS. 12A and 12B illustrate examples of the subchannel wavelet and its spectrum, respectively.

Referring to FIG. 11, an exemplary scheme for synthesis of a subchannel wavelet is illustrated, in accordance with one embodiment of the present invention. An example of the subchannel wavelet 1101 is shown in FIG. 12A. The subchannel wavelet 1101 represents the baseband wavelet 901 whose spectrum has been shifted to a corresponding subchannel carrier frequency $f_c$.

Figure 12B:
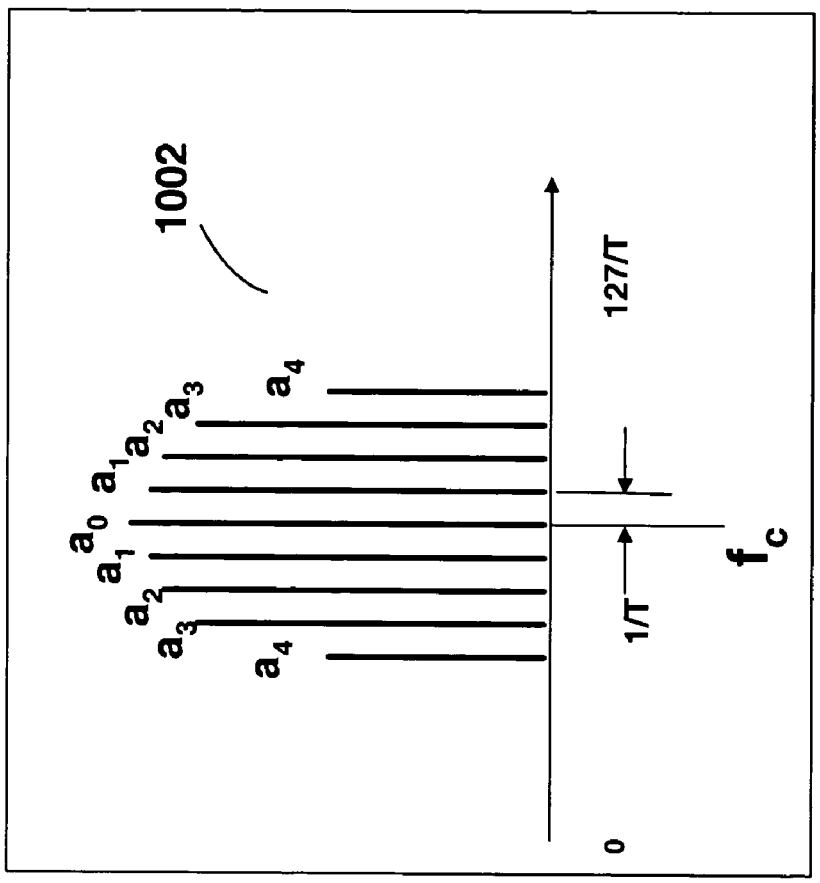

It should be understood that this scheme also employs the IFFT unit 312 and the P/S converter 92. However, the difference between the schemes shown in FIG. 9 and FIG. 11 is in the fact that for the synthesis of the subchannel wavelets those inputs of the IFFT unit are used which are centered at $f_c$. A spectrum 1102 of a subchannel wavelet is shown in FIG. 12B. This spectrum (as well as the spectrum of baseband wavelet 901) is constituted of 9 components with amplitudes $a_4, a_3, a_2, a_1, a_0, a_1, a_2, a_3, a_4$.

It should be noted that the FFT unit 312 performs not only the synthesis of the wavelet, but also provides an up-converter function. Hence, it should be understood from a comparison between the schemes shown in FIG. 1 and FIG. 11 that the synthesis filter-bank 105, plurality of up-converters 110 as well as the adder 115 used in the scheme shown in FIG. 1 may be simply replaced by the IFFT unit 312 shown in FIG. 11.

Figure 13:
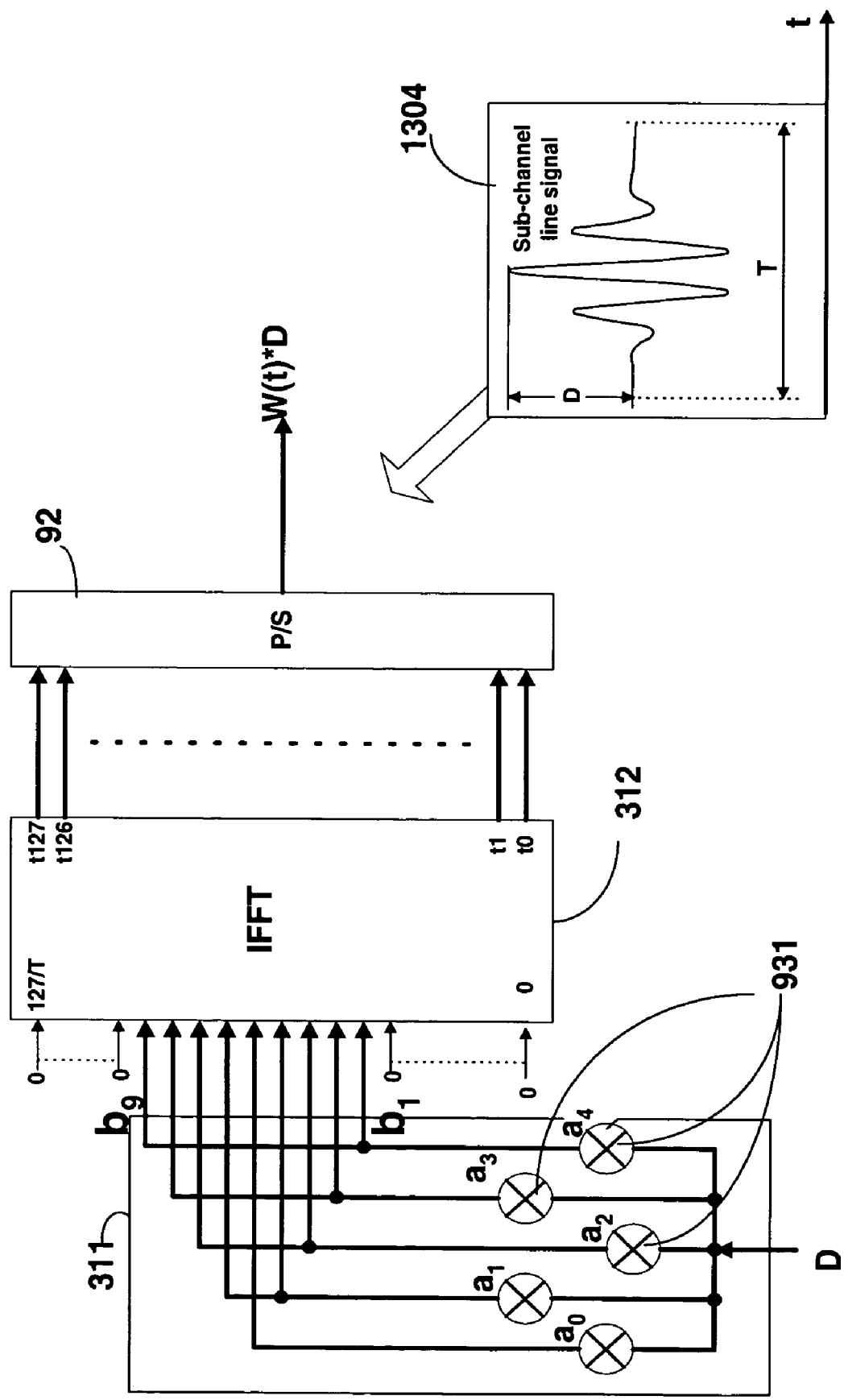
FIG. 13 illustrates a scheme for modulation of a subchannel by a data signal, according to one embodiment of the invention.

FIG. 13 demonstrates a scheme for modulation of a sub-channel by a data signal D, according to one embodiment of the invention. The scheme includes the modulator 311 arranged upstream of the IFFT unit 312. The modulator 311 includes a set of multipliers 931 that provide a multiplication of the data signal D by the corresponding wavelet coefficients (amplitudes $a_i$), to wit, $b_1 = Da_4$ $b_2 = Da_3$ $b_3 = Da_2$ $b_4 = Da_1$ $b_5 = Da_0$ $b_6 = Da_1$ $b_7 = Da_2$ $b_8 = Da_3$ $b_9 = Da_4$ According to this embodiment, the number of the multipliers 931 is equal to $(K-1)/2+1$, where $K=9$. The IFFT unit 312 is connected to the P/S converter 92, which provide a modulated sub-channel wavelet 1301.

Figure 14:
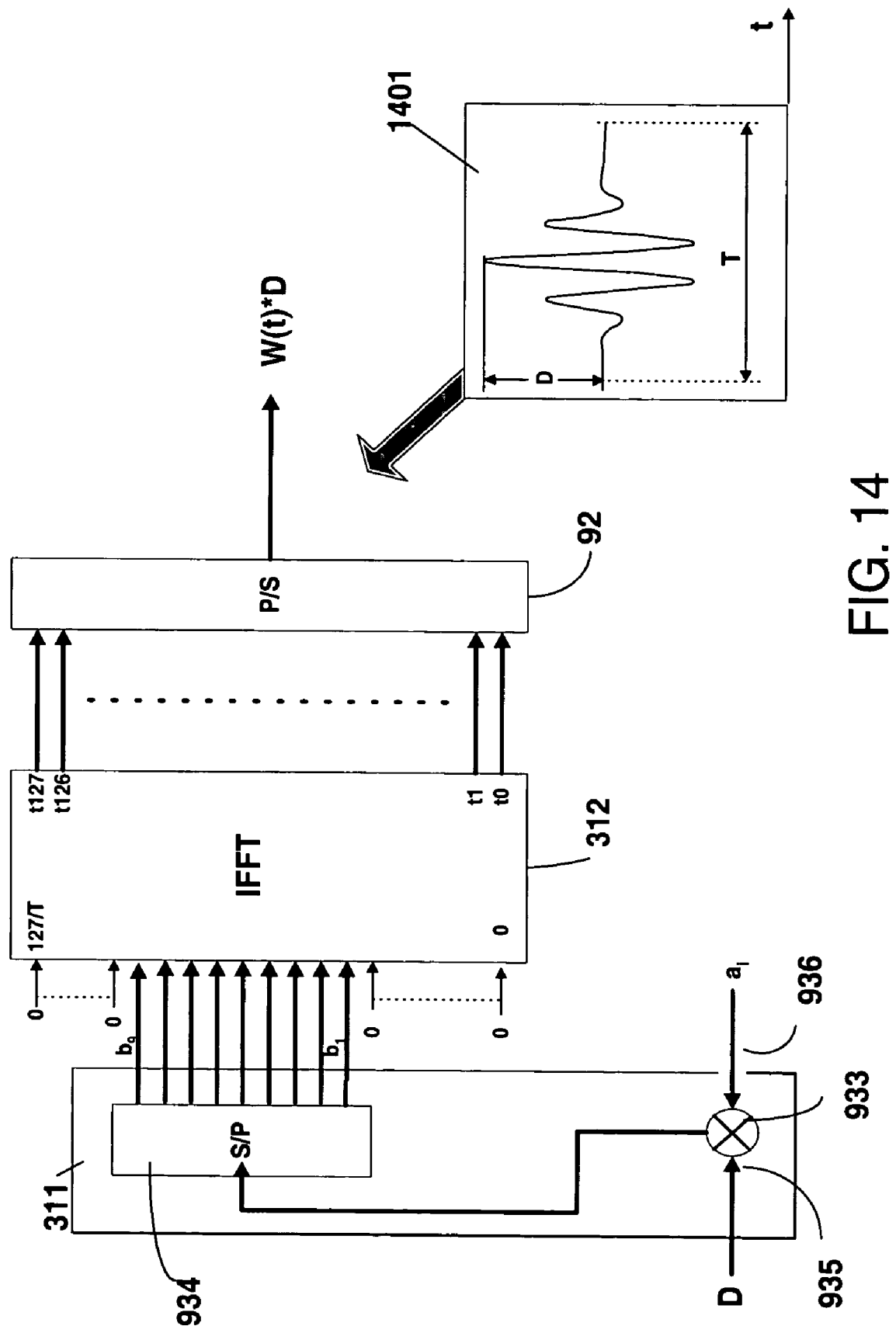
FIG. 14 illustrates a scheme for modulation of a subchannel by a data signal, according to another embodiment of the invention.

Referring to FIG. 14, a scheme for modulation of a sub-channel by a data signal D, according to another embodiment of the invention is illustrated. According to this embodiment, the modulator 311 includes one multiplier 933 and an serial-to-parallel (S/P) converter 934 coupled to the multiplier 933.

The multiplier 933 includes two input terminals, 935 and 936, arranged for feeding a data signal D to one of the inputs (e.g., to the input terminal 935) and a sequence of amplitudes $a_i$ to another input terminals (e.g., to the input terminal 936). As result, a sequence of the corresponding amplitudes $b_i$ is generated.

The output of multiplier 933 is fed to the S/P converter 934 that comprises K outputs. Each output is coupled to the corresponding input of the IFFT unit 312. As shown in FIG. 14, the S/P converter 934 distributes these K amplitudes (K=9) between the corresponding K inputs of the IFFT unit 312. In turn, the IFFT unit 312 is connected to the P/S converter 92, which provide a modulated sub-channel wavelet 1401, to wit: $D \cdot W(t)$.

Figure 15:
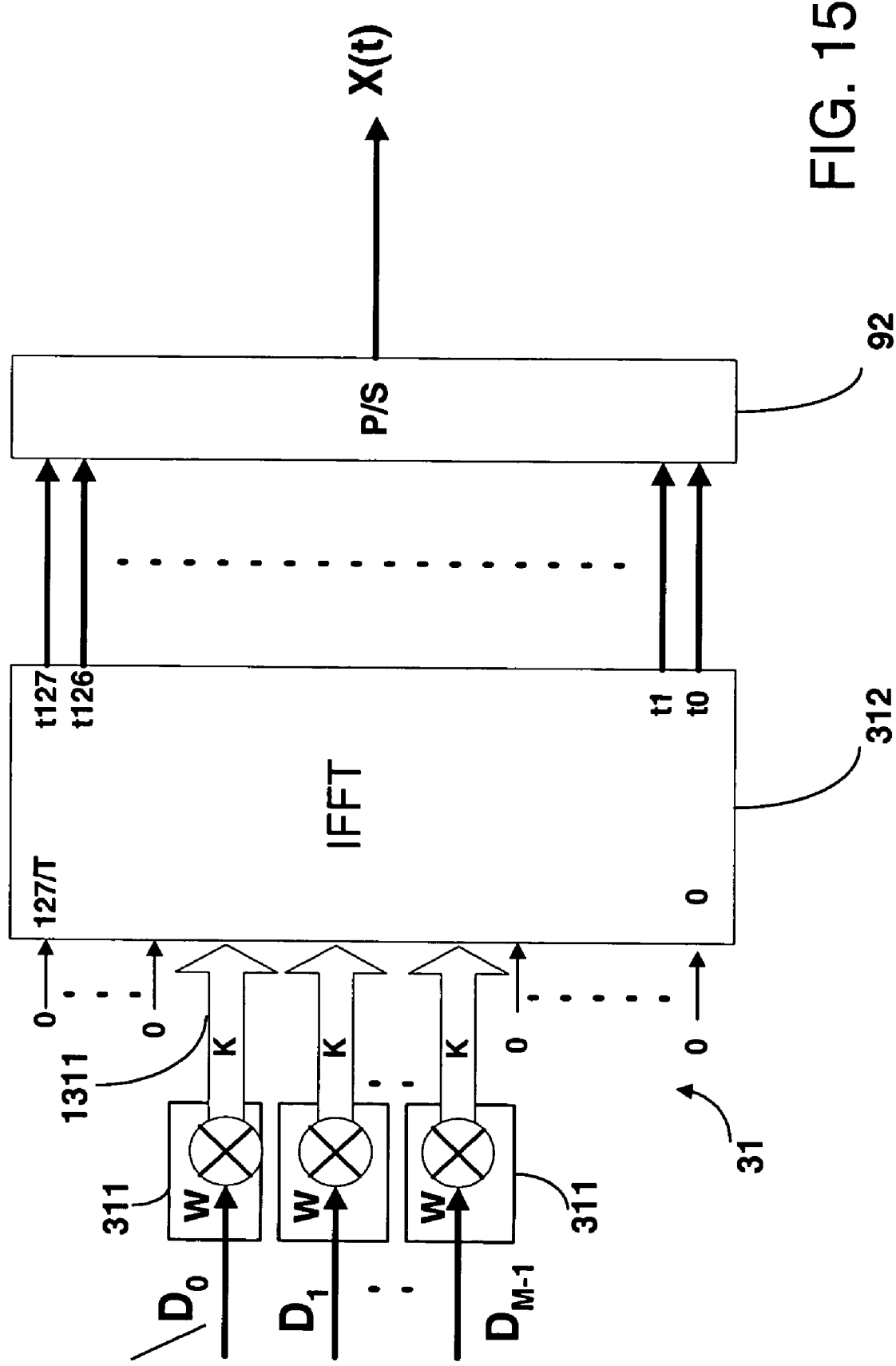
FIG. 15 illustrates a schematic block diagram of a synthesis filter-bank, in accordance with one embodiment of the present invention.

Referring to FIG. 15, a schematic block diagram of a synthesis filter-bank 31 is illustrated, in accordance with one embodiment of the present invention. The synthesis filter-bank 31 employs M subchannels for generating M wavelets. In accordance with this embodiment, the synthesis filter-bank 31 utilizes the scheme shown in FIG. 13 for modulation of the wavelets of the M subchannels by a vector $D=(D_0, D_1, \ldots, D_{M-1})$ of the data signal (information). In this case, i-th channel is modulated by the corresponding component $D^i$, of the vector D.

The synthesis filter-bank 31 includes M modulators 311 (one modulator for is each subchannel) coupled to the IFFT unit 312 and P/S converter 92 arranged downstream of the IFFT unit 312. Each modulator 311 has at least one input terminal configured for receiving a corresponding data signal from the vector D, and K output terminals coupled to the corresponding input terminals of the IFFT unit 312. The maximal number of the subchannels that can be implemented in this configuration depends on the number of the IFFT points, to wit:

$$M_{max} \leq N_{IFFT}/2K,$$

where $N_{IFFT}$ is the number of the IFFT points.

For example, when a 128-points IFFT is employed and the number of the frequency components of a subchannel wavelet (i.e., the number of cosine functions) K=9, the maximal number of subchannels is 7 (i.e., $M_{max}=128/18=7$). It should be understood that when required, an IFFT with a higher point's number $N_{IFFT}$ can be used. Accordingly, the wavelets can be synthesized from a higher number K of the cosine functions. For example, the VDSL Transceiver of the present invention can use $N_{IFFT}=1024$, while the wavelet can be synthesized from K=11 cosine function.

Figure 16:
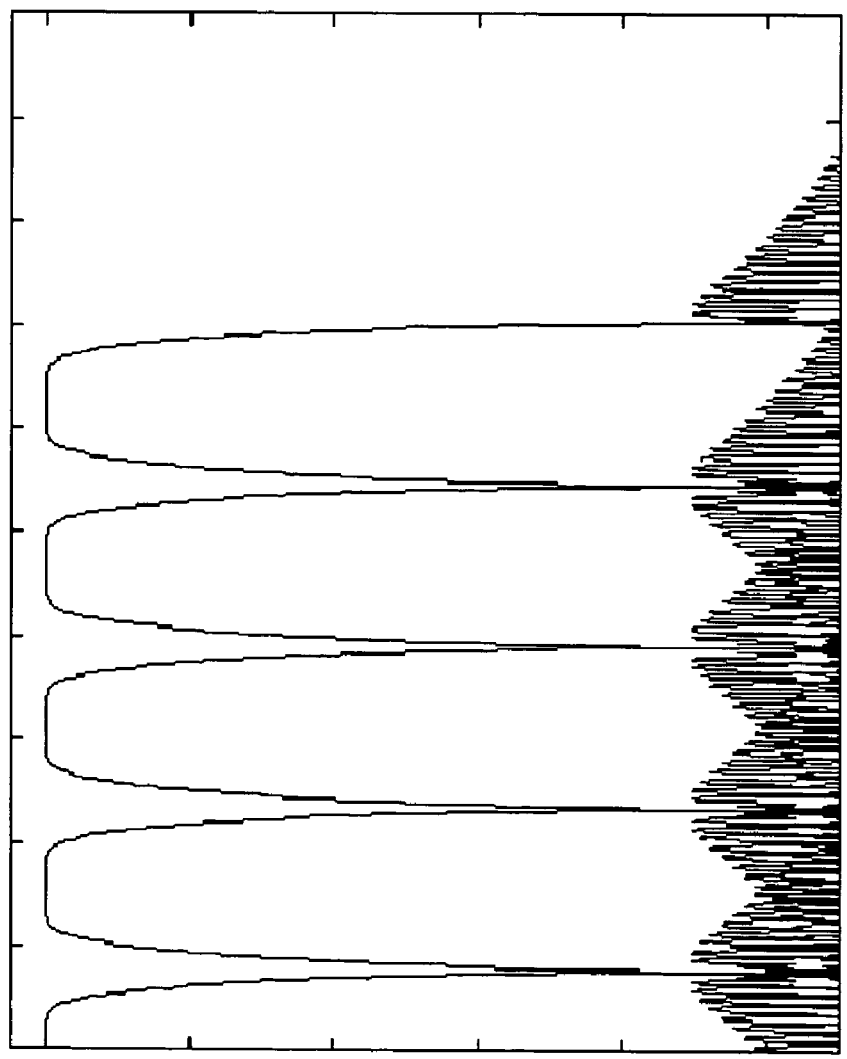
FIG. 16 illustrates an exemplary spectrum of the synthesized multicarrier signal synthesized by the synthesis filter-bank of FIG. 15.

A synthesized multicarrier signal is generated at the output of the P/S converter 92. An exemplary spectrum of the synthesized multicarrier signal 1501 is shown in FIG. 16. This signal corresponds to M frequency subchannels, each of them carrying the corresponding input data from the vector $D=(D_0, D_1, \ldots, D_{M-1})$.

Referring to FIG. 17, a schematic block diagram of a synthesis filter-bank 31 is illustrated, in accordance with another embodiment of the present invention. In accordance with this embodiment, the synthesis filter-bank 31 utilizes the scheme shown in FIG. 14 for modulation of the wavelets of the M subchannels by a vector $D=(D_0, D_1, \ldots, D_{M-1})$ of the data signal. The synthesis filter-bank 31 includes one modulator 311, the $N_{IFFT}$-points IFFT unit 312 downstream of the modulator 311 and the P/S converter 92 downstream of the IFFT unit 312. The modulator 311 includes one multiplier 933 and the Serial-to-Parallel (S/P) converter 934 which outputs are connected to the IFFT unit 312. It should be appreciated by a person skilled in the art that the synthesis filter-bank 31 has significantly less complexity than the prior art filter-bank shown in FIG. 1.

In operation, the data symbols of the input vector $D=(D_0, D_1, \ldots, D_{M-1})$ are fed in series to one input terminal 935 of the multiplier 933. On the other hand, a sequence of the wavelet's coefficients (amplitudes) $a_i$ is fed to another input terminal 936 of the multiplier 933. According to this embodiment, the modulator 311 processes all the input data symbols $D_0, D_1, \ldots, D_{M-1}$ successively. For each symbol $D_i$ the modulator 311 provides K modulated amplitudes $b_{(n)(i)}$ of the frequency components for each subchannel wavelet, $$D_i W(t) = \sum_{n=1}^{n=K} b_{(n)(i)} \cos(2\pi n t/T), \qquad (2)$$

where $n = 1, 2, \ldots, K$ and $i = 0, 1, \ldots, M - 1$.

These amplitudes $b_{(n)(i)}$ are fed in series to the S/P converter 934 which provide them to the $N_{IFFT}$-points IFFT unit 312. The IFFT unit 312 is able to process up to M subchannels, $M \leq N_{IFFT}/2K$. Output terminals 912 of the IFFT unit IFFT unit 312 are connected to input terminals 921 of the P/S converter 92 that provides a multicarrier line signal X(t) at its output terminal 923. An examplary spectrum 1801 of the multicarrier line signal X(t) containing M frequency subbands 1802 is shown in FIG. 18.

Turning back to FIG. 5, the overlapping unit 32 includes a parallel adder 321 and a shift register 322 coupled to the adder 321. The adder 321 is coupled to the output terminals of the IFFT unit 312 of the synthesis filter bank 31 and configured for (i) adding the data corresponding to N output terminals (points) of the IFFT unit 312 to the data of N shifted points provided by the shift register 322 and (ii) updating the data in the shift register 322. Accordingly, the shift register 322 is configured for (i) shifting the data stored therein on a predetermined number of points and (ii) generating the multicarrier signal carrying the information data signal. Preferably, the predetermined number of points is defined by a number of the wavelets that overlaps to each other, as will be described below in detail.

A principle of the overlapping transmission of the wavelets in accordance with present invention will be described hereinbelow. For purpose of simplicity, an example of the overlapped wavelet transmission only for one subchannel will be considered. For the simplicity of the notations, hereinafter, the prototype and modulated wavelets will be denoted by the same symbol W(t).

Figure 19B:
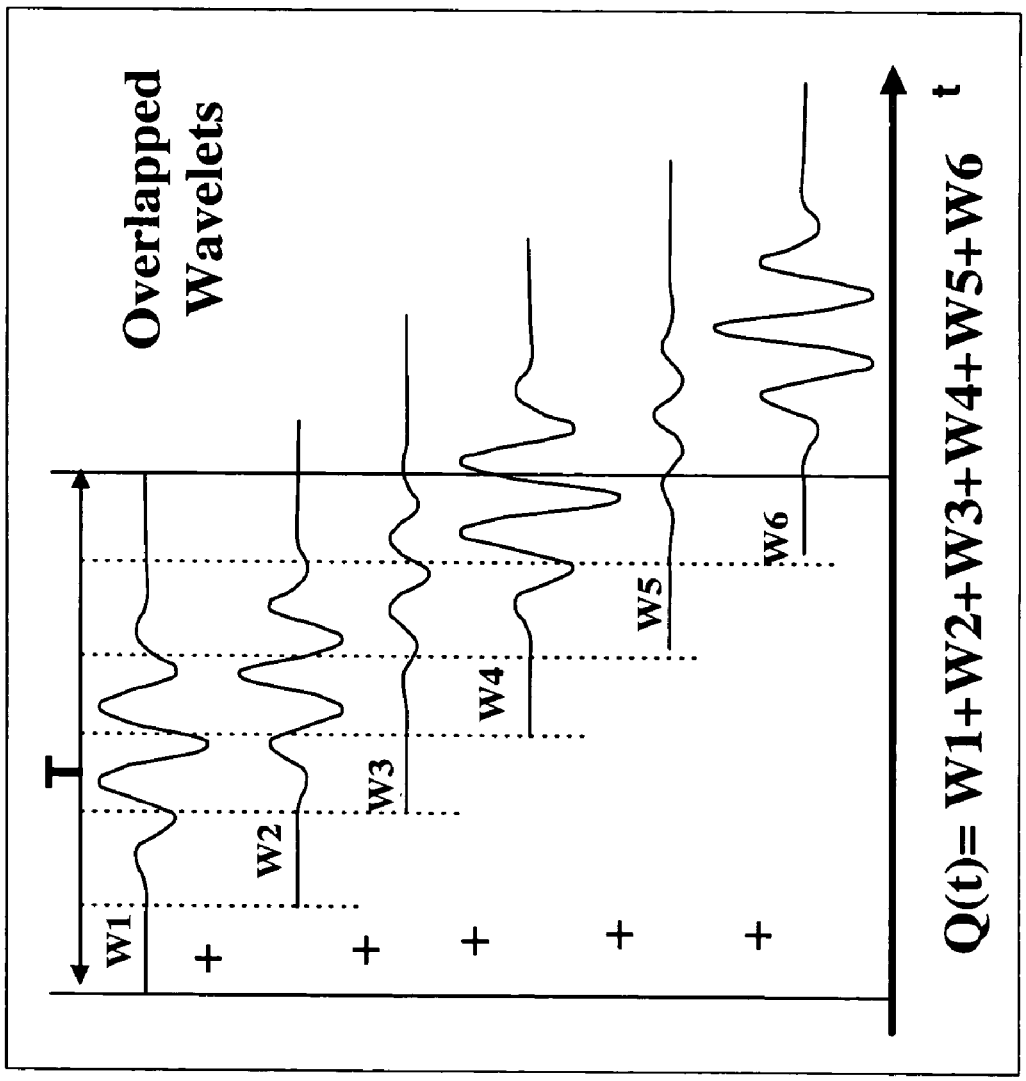

In operation, the IFFT unit 312 executes transformations of the input data into L wavelets $W_1, W_2, \ldots, W_L$ over the time interval T. These wavelets are fed to the parallel adder 321 that adds the wavelets with the data provided from the shift register 322, and then loads a result of the summing to the shift register 322. The data stored in the shift register 322 are shifted on $N_{IFFT}/L$ samples after every IFFT transform cycle. These shifted samples are provided to the communication line over the time interval T/L for transmitting. Thus, an output signal Q(t) provided by the shift register 322 represents a sum of the overlapped wavelets $W_1, W_2, \ldots, W_L$. Exemplary signals generated by the IFFT unit 312 and the shift register 322 for the case of L=6 are illustrated in FIGS. 19A and 19B, respectively.

For example, before the transmission, the shift register 322 can store signals of 0 values in each of its internal memory cells. After the first IFFT cycle, the adder 321 adds the output of the IFFT unit (i.e., wavelet $W_1$) to the contents of the shift register 322, and writes a result into the shift register 322. Thus, after the first IFFT transform cycle the shift register 322 stores the wavelet $W_1$. Thereafter, the data stored in shift register 322 are shifted on $N_{IFFT}/L$ points (e.g., 21 points for the case when $N_{IFFT}$=126 and L=6). Then, the first $N_{IFFT}/L$ points (samples) of the signal Q(t) are provided to the communication line from a serial output (not shown) of shift register 322 via the D/A converter 33 and the line driver 34, while the last $N_{IFFT}/L$ memory cells of shift register 322 are filled with zeros.

Further, the second IFFT transform provides $N_{IFFT}$ samples of the wavelet $W_2$ to the adder 321. As can be understood, at this moment, the $N_{IFFT}/L$ memory cells of the shift register 322 stores zeros while other $(N_{IFFT}-N_{IFFT}/L)$ memory cells store a remaining portion of the shifted $W_1$ (that was not transmitted yet). The data stored in the shift register 322 is provided to the adder 321 for summing with the samples of the wavelet $W_2$ provided from the IFFT unit 312, and the result is stored in the shift register 322. Then, the result of the summing is shifted on $N_{IFFT}/L$ points, and the first shifted samples are provided to the communication line for transmission, while the last $N_{IFFT}/L$ cells of the memory of the shift register are filled with zeros. After this step, the shift register stores zeros in the last $N_{IFFT}/L$ memory cells of the shift register 322 along with a combination of the remaining portions of the shifted wavelets $W_1$ and $W_2$ in other $(N_{IFFT}-N_{IFFT}/L)$ memory cells. The process continues L IFFT transform cycles for providing and transmitting the entire overlapped wavelet sequence Q(t) over the communication line. It should be appreciated that although the transmission for one subchannel have been described here, the overlapping process described above may be extended to any number of subchannels of the Synthesis Filter-Bank, due to the linearity of the IFFT transform.

Turning back to FIG. 5, the receiver 4 includes an analog-to-digital (A/D) converter 41 coupled to the communication line 2, a separating unit 42 coupled to the A/D converter 41 and an analyzing filter bank 43 coupled to the separating unit 42. When required, the receiver 4 can include an amplifier 44 arranged before the A/D converter 41.

The separating unit 42 includes a separating shift register 421, and a parallel register 422 including N latch circuits (not shown) configured for storing the output of the separating shift register 421. The separating shift register 421 includes a serial input port 4211 and N parallel output ports 4212 and configured for obtaining the multicarrier signal comprising overlapped wavelet sequences Q(t) from the communication line 2 by the input port 4211 (via the A/D converter 41) and shifting the obtained data on the predetermined number of points.

According to one embodiment of the invention, the separating shift register 421 provides shifting samples of input signal Q(t) on N/L samples (i.e. FFT points) every T/L time interval in the manner opposite to that of the shift register 322 of the transmitter 3. After the shifting, the parallel register 422 stores the data obtained from the output ports 4212 of the separating shift register 421. The data stored in the parallel register 422 are fed to the analyzing filter bank 43 for a further treatment.

According to one embodiment of the invention, the analyzing filter bank 43 includes an N-points FFT unit 431, at least one equalizer 432 and at least one demodulator 433. The N-points FFT unit 431 is configured for obtaining the data from the parallel register and calculating K spectral frequency components (phases and amplitudes) of each subchannel wavelet. The equalizer 432 is configured for obtaining the K spectral frequency components of each subchannel wavelet and eliminating distortions which these components received in the communication line 2 independently for each component. The demodulator 433 is configured for obtaining the K spectral frequency components for each subchannel wavelet and generating the data signal D.

Prior to the description of the operation of the analyzing filter bank 43 as entire unit, the operation of its components will be described herebelow in detail.

Figure 20:
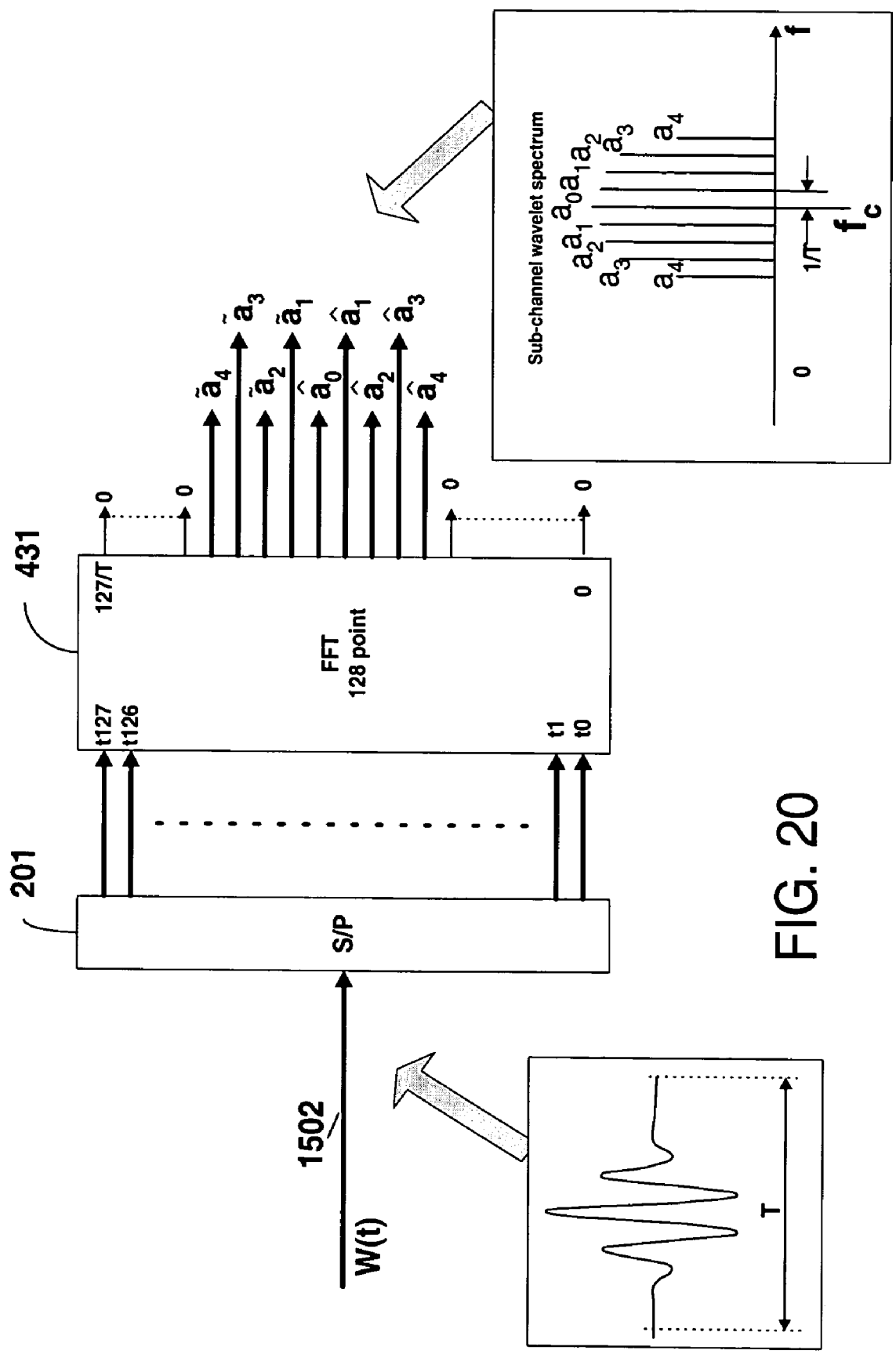
FIG. 20 illustrates an exemplary scheme for analysis of a subchannel wavelet, according to one embodiment of the invention.

Referring to FIG. 20, an exemplary scheme for analysis of a subchannel wavelet is illustrated, according to one embodiment of the invention. This scheme operates in a manner reversed to that shown in FIG. 11. For this purpose the scheme employs a serial-to-parallel (S/P) converter 201 and the N input points of FFT unit 431. The S/P converter 201 receives an ideal subchannel wavelet W(t) of the present invention (see, for example, FIGS. 10A and 10B) and transforms the wavelet into N input points which are fed to the FFT unit 431. In the case when N=128 and K=9, the 128-points FFT unit 431 provides, inter alia, wavelet's amplitudes $a_4, a_3, a_2, a_1, a_0, a_1, a_2, a_3, a_4$, which are centered at the subchannel carrier frequency $f_c$.

It should be noted that in a real case when the wavelet $\hat{W}(t)$ is actual, i.e., provided from the communication line (2 in FIG. 5), the received amplitudes $\hat{a}_4, \hat{a}_3, \hat{a}_2, \hat{a}_1, \hat{a}_0, \tilde{a}_1, \tilde{a}_2, \tilde{a}_3, \tilde{a}_4$, are not equal to the original amplitudes $a_4, a_3, a_2, a_1, a_0, a_1, a_2, a_3, a_4$ of the transmitted wavelet W(t), owing to the noise and frequency distortion in the communication line (cable) 2. Therefore, a frequency equalizer is necessary in reality for correcting the amplitudes of the received subchannel wavelet. Examples of such an equalizer will be described hereinbelow.

Figure 21:
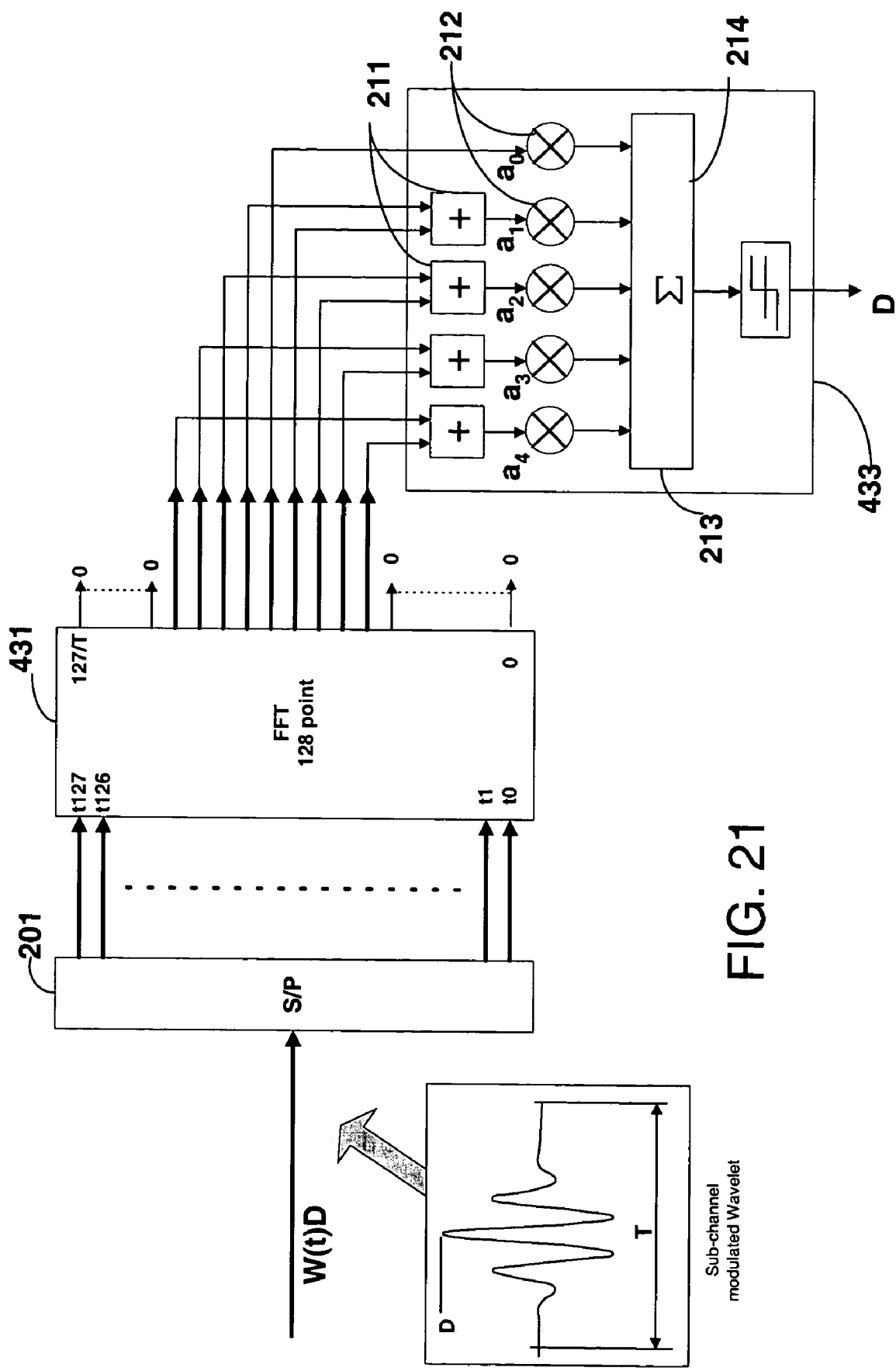
FIG. 21 illustrates a scheme of operation of the demodulator for demodulation of a subchannel wavelet that was modulated by information data, according to one embodiment of the invention.

Referring to FIG. 21, a scheme of operation of the demodulator 433 is illustrated for demodulation of a subchannel wavelet $\hat{W}(t)$ that was modulated by information data D in the transmitter (3 in FIG. 5), according to one embodiment of the invention. Such a modulated wavelet $\hat{W}(t) \cdot D$ (generated, for example, by schemes shown in FIG. 13 and/or FIG. 14) is fed first to the S/P converter 201 where the modulated wavelet is transformed into N input points (N=9) which are provided to the 128-points FFT unit 431. Thereafter, the amplitudes $\hat{a}_4, \hat{a}_3, \hat{a}_2, \hat{a}_1, \hat{a}_0, \tilde{a}_1, \tilde{a}_2, \tilde{a}_3, \tilde{a}_4$ of the modulated wavelet $\hat{W}(t) \cdot D$ provided by the 128-points FFT unit 431 are fed to the demodulator 433. In the case when N=128 and K=9, the demodulator 433 comprises four adders 211, five multipliers 212, a multi-channel adder 213, and a decision unit 214. The adders 211 sum up the amplitudes having the same index (e.g., $\hat{a}_4$ and $\tilde{a}_4$; $\hat{a}_3$ and $\tilde{a}_3$; $\hat{a}_2$ and $\tilde{a}_2$; $\hat{a}_1$ and $\tilde{a}_1$) and provide the summing results to the multipliers 212. Each multiplier is configured for multiplying each of the K spectral frequency components of each sub-channel wavelet by the corresponding wavelet coefficient. The adder 213 is configured for combining the K results of the multiplying for each of sub-channel wavelet. The decision unit 214 is connected to the adder 213 for quantizing the data obtained from the adder, thereby obtaining the data signal D.

According to this embodiment of the invention, the demodulator 433 calculates the information data D in accordance with the following equation:

$$\hat{D} = [(\hat{a}_4 + \tilde{a}_4)a_4 + (\hat{a}_3 + \tilde{a}_3)a_3 + (\hat{a}_2 + \tilde{a}_2)a_2 + (\hat{a}_1 + \tilde{a}_1)a_1 + \hat{a}_0 a_0]. \quad (3)$$

In the general case, the information data D can be calculated according to the equation $$D = \sum_{k=1}^{(K-1)/2+1} (\hat{a}_k + \tilde{a}_k)a_k + \hat{a}_0 a_0, \quad (4)$$

where $\hat{a}_k$ and $\tilde{a}_k$ are the spectral amplitudes of the received wavelet centered at the spectral amplitude $\hat{a}_0$, $a_k$ is an amplitude of k-th frequency component of an original prototype wavelet centered at $a_0$, and K is a number of the all frequency components in every wavelet.

It should be noted that the purpose of the operation of the FFT unit 431 together with the demodulator 433 to execute a convolution operation for the modulated wavelet and the base wavelet is analogous to purpose of the prior art analysis prototype filter (121 in FIG. 1).

Figure 22:
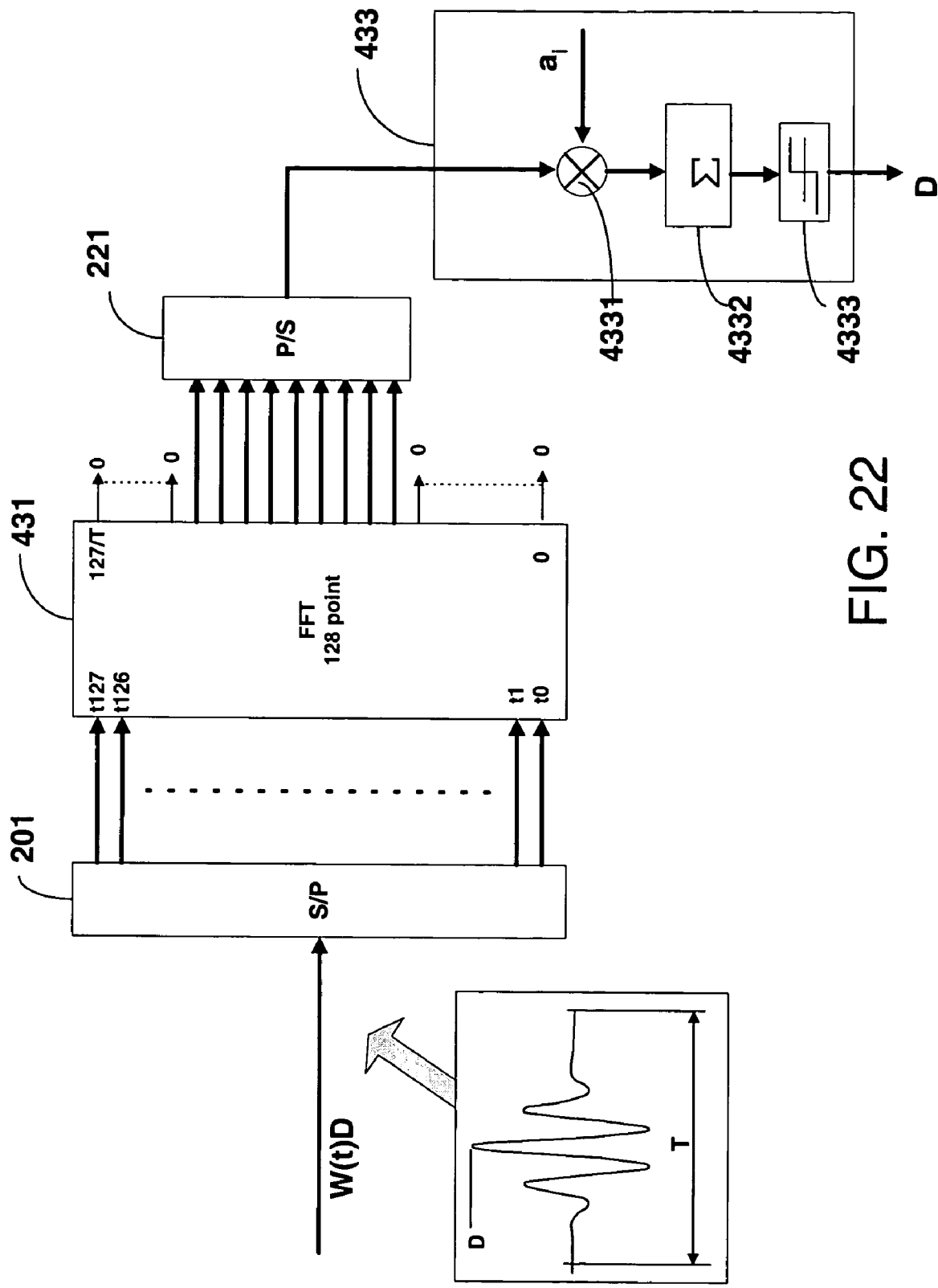
FIG. 22 illustrates a scheme of operation of the demodulator for demodulation of a subchannel wavelet that was modulated by information data, according to another embodiment of the invention.

FIG. 22 illustrates a scheme of operation of the demodulator 433 for demodulation of a subchannel wavelet that was modulated by information data D in the transmitter (3 in FIG. 5), according to another embodiment of the invention. According to this scheme, the modulated wavelet $\hat{W}(t) \cdot D$ is fed first to the S/P converter 201 where wavelet $\hat{W}(t) \cdot D$ is transformed into 128 input points, which are provided to the FFT unit 431. Thereafter, the amplitudes $\hat{a}_4, \hat{a}_3, \hat{a}_2, \hat{a}_1, \hat{a}_0, \tilde{a}_1, \tilde{a}_2, \tilde{a}_3, \tilde{a}_4$ of the modulated wavelet $\hat{W}(t) \cdot D$ provided by the 128-points FFT unit 431 are fed to a P/S converter 221 arranged downstream of the FFT unit 431 and coupled to the demodulator 433.

According to this embodiment of the invention, the demodulator 433 includes a multiplier 4331 coupled to the P/S converter 221, an adder 4332 downstream of the multiplier 4331 and decision unit 4333 downstream of the adder 4332. The multiplier 4331 is configured for multiplication of the sequence of the wavelet amplitudes $\hat{a}_4, \hat{a}_3, \hat{a}_2, \hat{a}_1, \hat{a}_0, \tilde{a}_1, \tilde{a}_2, \tilde{a}_3, \tilde{a}_4$ provided by the P/S converter 221 by a sequence of amplitudes $a_4, a_3, a_2, a_1, a_0, a_1, a_2, a_3, a_4$ of the corresponding prototype wavelet. The adder 4332 provides a sum of the wavelet components, and the decision unit 4333 generates the information data symbol D calculated in accordance with Eq. (3) (or Eq. (4), in the general case).

It should be appreciated that the demodulation scheme, according to this embodiment of the invention, includes a smaller number of components then the scheme shown in FIG. 21.

Figure 23:
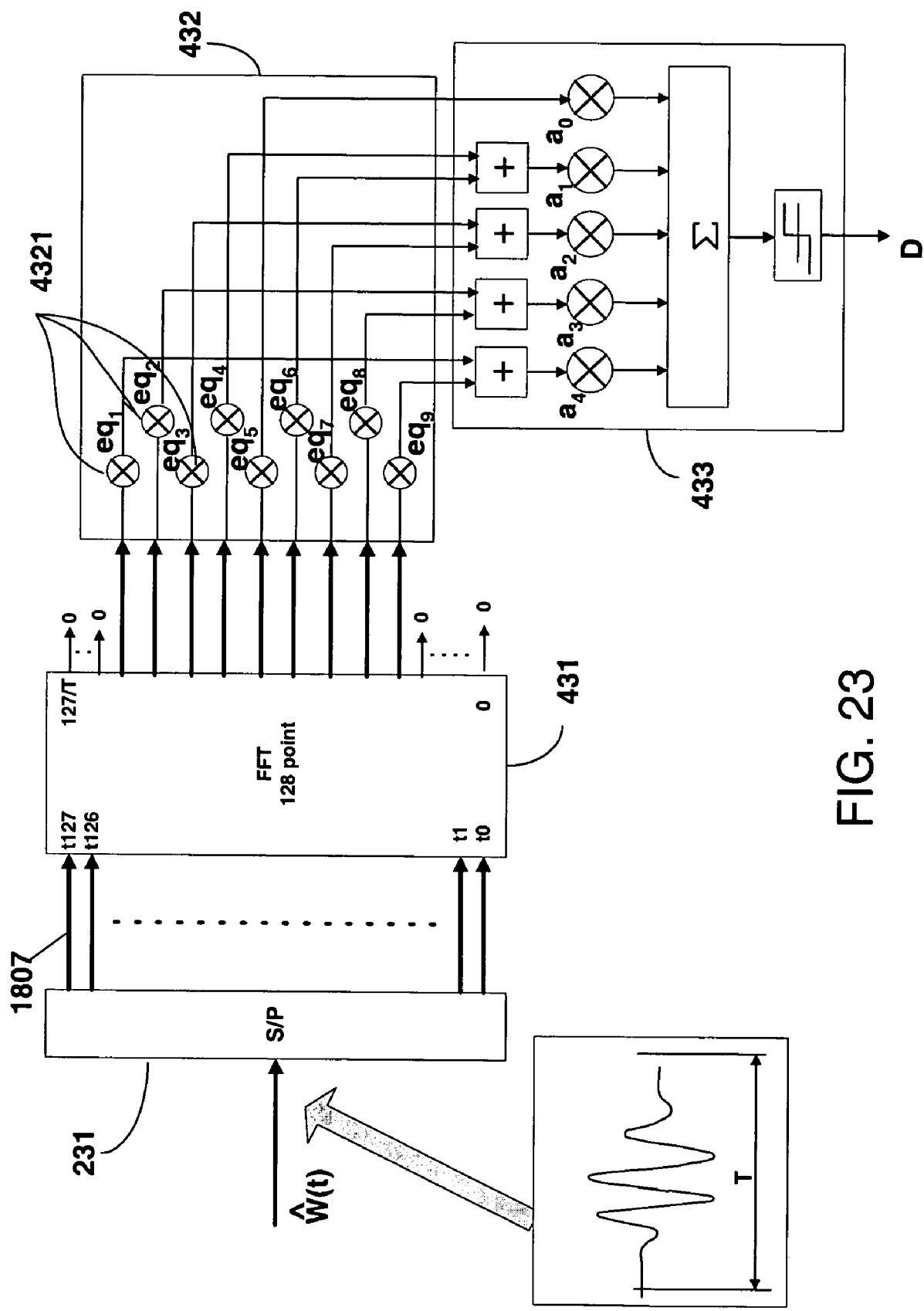
FIG. 23 illustrates an analysis filter bank of the present invention, according to one embodiment of the invention.

Referring to FIG. 23, the analysis filter bank 43 of the present invention is illustrated, according to one embodiment of the invention. The analysis filter bank 43 employs M subchannels, each of the subchannels is configured for carrying the corresponding information data symbols $D_0, D_1, \ldots, D_{M-1}$.

In operation, a multicarrier signal $\hat{Y}(t)$, received from the communication line (2 in FIG. 5), e.g., a cable twisted pair, can be fed to a serial input terminal of a S/P converter 231. The S/P converter 231 has N parallel output terminals, each of them being connected to a corresponding input terminal of the N-points FFT unit 431. The N output terminals the FFT unit 431 are arranged in M groups (M=N/K). Each of the groups is associated with a corresponding subchannel. In other words, each group includes K output terminals for providing a signal representing, the phases and amplitudes of the M corresponding subchannel wavelets.

According to this embodiment, the analysis filter bank 43 includes M equalizers 432 arranged downstream of the M groups of the FFT output terminals, and M demodulators 431 arranged downstream of the M equalizers 432, correspondingly. It should be noted that only one such equalizer, and one demodulator are shown in FIG. 23. According to this embodiment, each demodulator 431 is analogous to the demodulator described above with reference to FIG. 21. Thus, the output signal provided by each demodulator 431 represents the corresponding information data symbol $D_j$ transmitted via the corresponding j-th subchannel (j=0, 1, ..., M−1).

It should be appreciated by a person versed in the art that the analysis filter bank 43 can provides an "ideal" reconstruction of subchannel wavelets only in the case when the communication channel (2 in FIG. 5) does not have noise and phase-amplitude distortions. However, in reality, a received multicarrier signal $\hat{Y}(t)$ is a distorted signal. $\hat{Y}(t)$ includes, inter alia, a noise signal (e.g., a Gaussian noise $N_g$) and a distorted transmitted signal $\hat{X}(t)$ The distorted transmitted signal has a spectrum of $\hat{X}(f) = X(f)C(f)$, where X(f) is the spectrum of the original signal X(t) and C(f) is the frequency response of the communication channel (2 in FIG. 5). Thus, the phase-amplitude distortion of the received signal Y(t) may be eliminated by using an equalizer. For example, the equalizer can have the following frequency response: $EQ(f)=1/C(f)$. In such a case, $\hat{X}(f)=X(f)C(f)EQ(f)=X(f)$.

In accordance with present invention, a transform of the received wavelet $\hat{W}(t)$ to frequency domain provided by the N-points FFT unit 431 for each subchannel is fed to the corresponding equalizer 432. As described above, the K outputs of FFT unit 431 for each subchannel represent complex numbers $z_{(k)}$ that can be obtained by $z_{(k)}=a_{(k)}C_{(k)}$, where $a_{(k)}$ is the amplitude of the k-th cosine function of the transmitted wavelet and $C_{(k)}$ is the complex number that represent a frequency response of the communication line (channel) at the frequency of the corresponding cosine function.

According to the example shown in FIG. 23, the equalizer 432 of each j-th subchannel (j=0, 1, . . . , M−1) includes K multipliers 4321 coupled to the K output terminals of the corresponding subchannel. When K=9, the received wavelet $\hat{W}(t)$ has 9 components. Thus, 9 corresponding outputs provided by the FFT unit 431 for each subchannel are fed to one of the input terminals of the corresponding multipliers 4321. Each multiplier 4321 provides a multiplication of complex number $z_{(k)}$ on the complex equalizer coefficient $eq_{(k)}$ that is fed to a second input terminal of the multiplier. The k-th output $E_{(k)}$ of the equalizer 432 can be calculated as a product of $z_{(k)}$ by eq(k), to wit: $E_{(k)}=z_{(k)}eq_{(k)}$. When the condition of $eq_{(k)}=1/C_{(k)}$ is fulfilled, the signal generated by the equalizer 432 can be obtained by $E_{(k)}=z_{(k)}C_{(k)}eq_{(k)}=a_{(k)}$. The signal $a_{(k)}$ is the corrected k-th amplitude of the modulated wavelet in which the amplitude-phase distortions of the communication is channel are eliminated. It should be appreciated by a person skilled in the art that a high quality of the equalization can be achieved, because the equalizer 432 processes each k-th frequency component of the received modulated wavelet $\hat{W}(t)$ independently. The K outputs of the equalizer 432 are fed to the demodulator 433 that for each subchannel employs the demodulation scheme described above with reference to FIG. 21.

Figure 24:
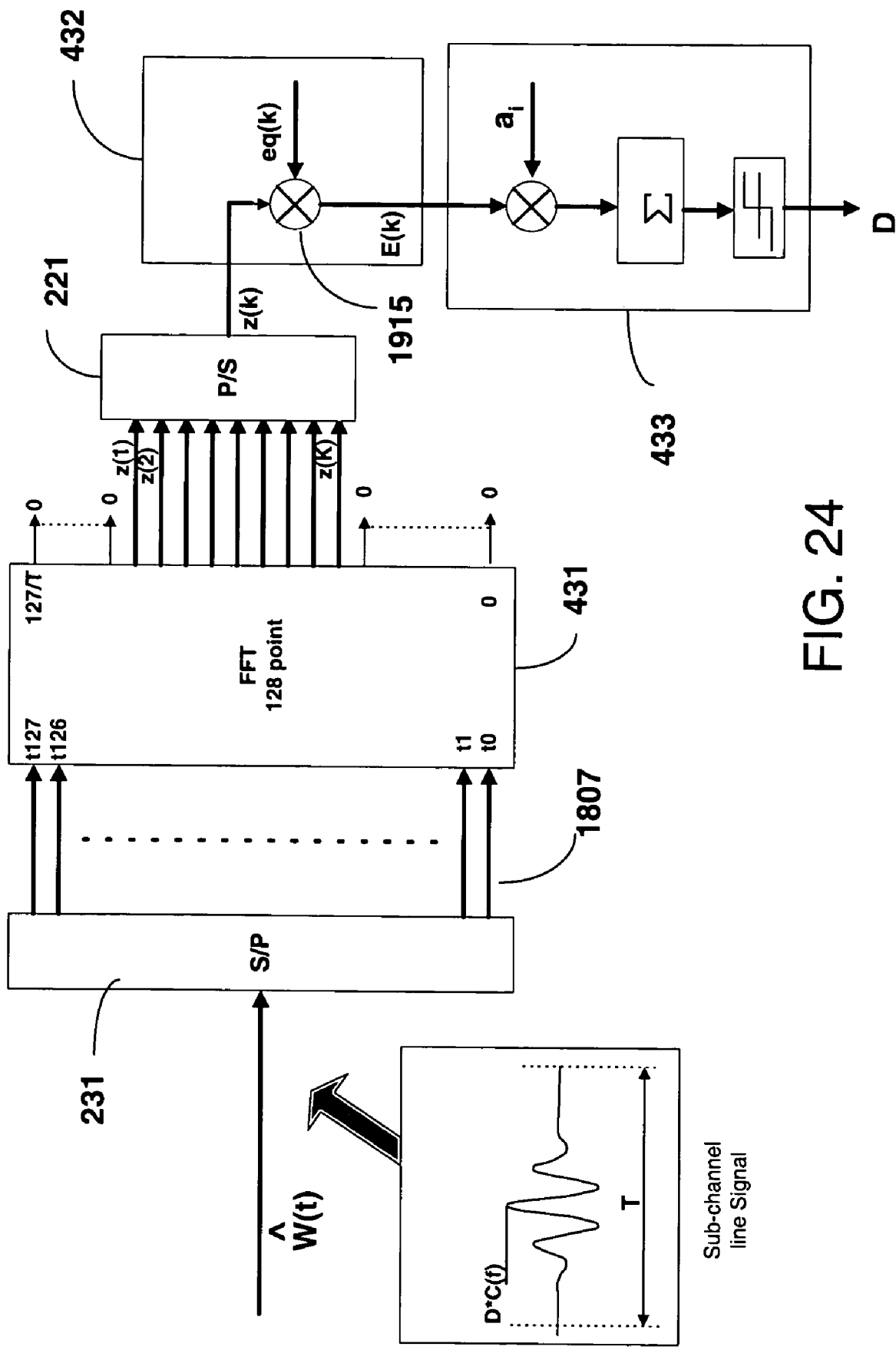
FIG. 24 illustrates an analysis filter bank of the present invention, according to another embodiment of the invention.

Referring to FIG. 24, the analysis filter bank 43 of the present invention is illustrated, according to another embodiment of the invention. The analysis filter-bank 43 includes the FFT unit 431, M equalizers 432 arranged downstream of the of the FFT unit 431, and M demodulators 431 arranged downstream of the M equalizers 432, correspondingly. It should be noted that only one such equalizer and one demodulator are shown in FIG. 24. As well as in the above example, the N output terminals the FFT unit 431 are arranged in M groups (M=N/K). Each of the groups is associated with a corresponding subchannel.

According to this embodiment, each demodulator 431 is analogous to the demodulator described above with reference to FIG. 22. Therefore, the analysis filter-bank 43 also includes M parallel-to-serial (P/S) converters 221 arranged downstream of the FFT unit 431. Each P/S converter 221 provides a sequence of complex numbers $z_{(1)}, z_{(2)}, \ldots, z_{(K)}$ to the corresponding equalizer 432 for each subchannel.

According to this embodiment of the invention, the equalizer 432 includes only one multiplier 4321. One input terminal of the multiplier 4321 is coupled to the output of P/S converter 221. A sequence of the complex equalization coefficients $eq_{(1)}, eq_{(2)}, \ldots, eq_{(K)}$ is fed to another input terminal of the multiplier 4321. As a result, a sequence of the equalized amplitudes $E_{(k)}=z_{(k)}eq_{(k)}=a_{(k)}$ (where k=1, 2, . . . K) generated by the equalizer 432 for each j-th subchannel is fed to the corresponding demodulator 431 for generating the transmitted information data signal $D_j$ (where j=0, 1, . . . , M−1).

Figure 25:
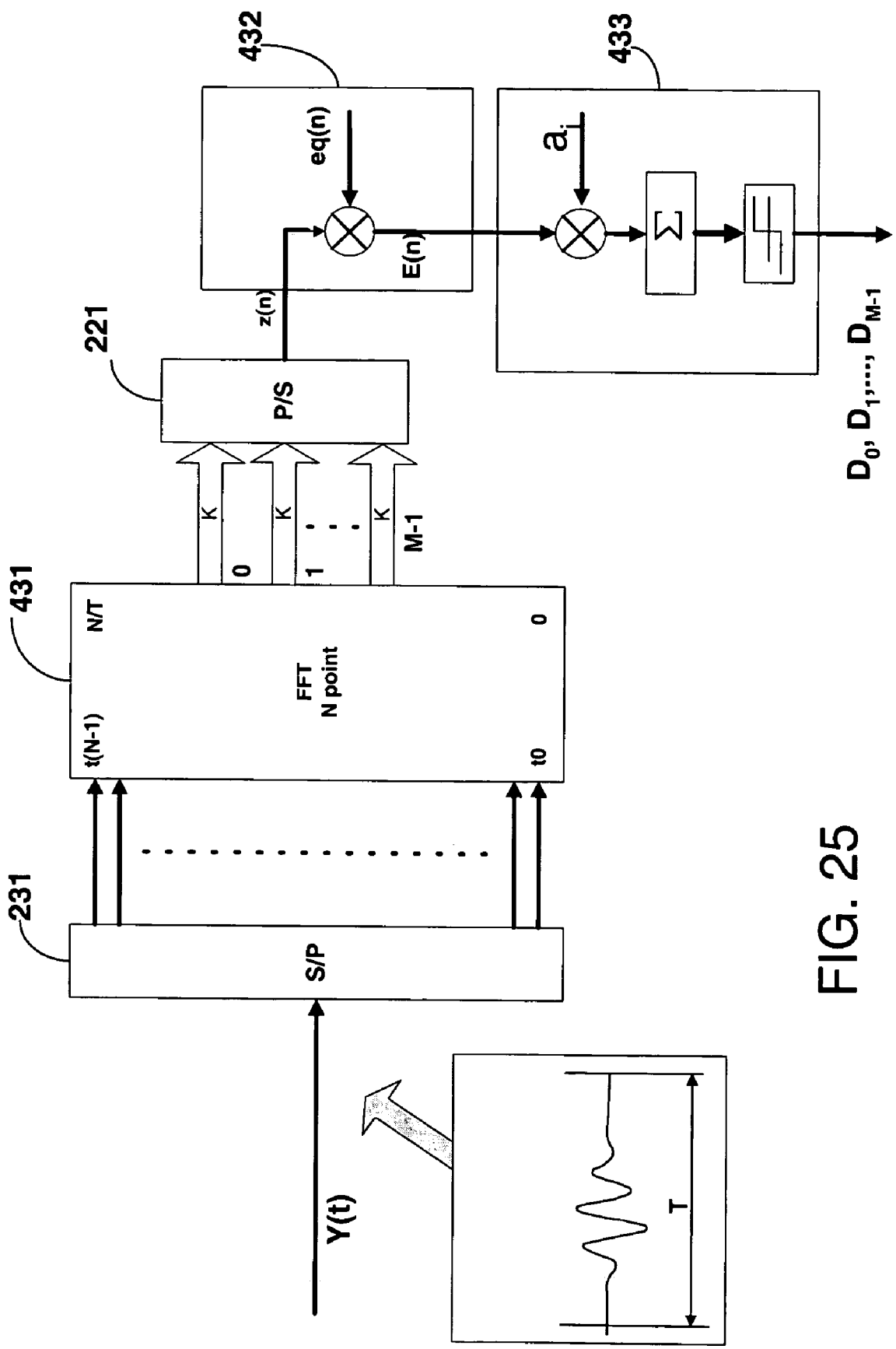
FIG. 25 illustrates an analysis filter bank of the present invention, according to yet an embodiment of the invention.

Referring to FIG. 25, the analysis filter bank 43 of the present invention is illustrated, according to a further embodiment of the invention. The analysis filter-bank 43 in accordance with this embodiment of the present invention includes the N-points FFT unit 431, one P/S converter 221, one equalizer 432 and one demodulator 433. In operation, the analysis filter-bank 43 in accordance with this embodiment utilizes a successive processing of the complex numbers z(k) provided by the FFT unit 431.

More specifically, a multicarrier line signal $\hat{Y}(t)$ arrives from a communication line (channel) 2 to a serial input terminal of the S/P converter 231. The S/P converter 231 has N parallel output terminals, each of them being connected to a corresponding input terminal of the N-points FFT unit 431. The N output terminals the FFT unit 431 are arranged in M groups (M=N/K). Each of the groups is associated with a corresponding subchannel.

According to this embodiment, the P/S converter 221 provides a sequence $z_{(0)}, z_{(1)}, \ldots, z_{(N-1)}$ of the modulated wavelet components for all the M subchannels. The equalizer 432 and the demodulator 433 operate in the same manner as described above with reference to FIG. 24. As a result of such an operation, the equalizer 432 multiplies each $z_{(n)}$ component by the corresponded equalization coefficient $eq_{(n)}$, and generates a sequence of $E_{(n)}$ (where n=0, 1, . . . , N−1), which are corrected amplitudes $a_{(n)}$ of the cosine functions of the modulated wavelets for all the M subchannels. Thereafter, the demodulator 433 successively provides the information data $D_0, D_1, \ldots, D_{M-1}$ corresponding to all the M subchannels.

It should be noted that the N-points FFT unit 431 executes L transforms over the time interval T. The equalizer 432 and the demodulator 433 operate in such a manner that one output information data symbol $D_i$ is calculated every T/L time unit. Because the wavelets $W_1, W_2, \ldots, W_L$ are orthogonal, only one such wavelet $W_i$ is processed over each time interval T/L. As a result, the demodulator 433 provides a sequence of the information symbols $D_0, D_1, \ldots, D_{M-1}$, carried by the wavelets.

As such, those skilled in the art to which the present invention pertains, can appreciate that while the present invention has been described in terms of preferred embodiments, the concept upon which this disclosure is based may readily be utilized as a basis for the designing of other structures, systems and processes for carrying out the several purposes of the present invention.

It should be understood that although the proposed invention have been described above in connection with transmission data over cable wires, the concept of the invention can be also extended to the transmitting of data over wireless channels, radio channels, coaxial lines, fiber optical lines, power lines, etc. Moreover, the concept of the invention may be utilized not only in communication, but also in different applications with digital signal processing, e.g. radiolocation, acoustics, signal recording, etc.

Also, it is to be understood that the phraseology and terminology employed herein are for the purpose of description and should not be regarded as limiting.

In the method claims that follow, alphabetic characters used to designate claim steps are provided for convenience only and do not imply any particular order of performing the steps.

It is important, therefore, that the scope of the invention is not construed as being limited by the illustrative embodiments and examples set forth herein. Other variations are possible within the scope of the present invention as defined in the appended claims and their equivalents.

The invention claimed is:

1. A method for transmission of information data by modulated wavelets over a communication line through a plurality of subchannels, the method comprising the following steps all carried out by a transmitter:

(a) obtaining said information data;

(b) providing predetermined coefficients representing amplitudes of frequency components of a prototype wavelet;

(c) for each sub-channel, generating a signal representing modulated coefficients by multiplying the information data by said amplitudes of frequency components;

(d) generating over a time interval T a sequence of L subchannel modulated non-overlapped wavelets by applying an N Inverse Fast Fourier Transform, IFFT, to said signal representing modulated wavelet coefficients;

(e) overlapping over the time interval T said sequence of L subchannel modulated non-overlapped wavelets for generating a multi-carrier signal comprising the overlapped wavelets carrying the information data, the overlapping comprising the steps of:

(i) starting the overlapping by storing in a shift register zero values;

(ii) for each of a plurality of IFFT cycles adding output IFFT data obtained in step (d) that represent the modulated non-overlapped wavelets obtained by N-points IFFT at the current cycle to the shift register for storing therein;

(iii) for each of the plurality of IFFT cycles shifting the data stored in the shift register on a number P of points equal to N/L;

(iv) providing every IFFT cycle the data from the first P points of the shift register to said communication line for transmitting therethrough and (v) filling the last P points with zeros;

(vi) repeating steps (ii) to (v) L times for providing and transmitting the entire overlapped wavelet sequence over the communication line.

2. The method of claim 1 further comprising the step of D/A converting said multicarrier signal before transmitting over the communication line.

3. The method of claim 1 wherein said communication line is a pair of copper wires.

4. The method of claim 1 wherein the prototype wavelet is represented as a sum of K cosine functions, to wit:

$$W(t) = \sum_{n=1}^{n=K} a_n \cos(2\pi n t / T),$$

where T is a length of the wavelet; n is a natural number counting the frequency components; K is a number of the frequency components; and $a_n$ is the amplitude of the n-th frequency component.

5. A method for reception of information data transmitted by modulated overlapped wavelets over a communication line, the method comprising the following steps all carried out by a receiver:

(a) receiving a distorted multicarrier signal including a signal representing a sequence of L overlapped subchannel modulated wavelets carrying said information data together with a noise signal provided by said communication line during the transmission;

(b) separating said overlapped wavelets by shifting the wavelets with respect to each other on a number of samples equal to N/L points of an N-point Fast Fourier Transform (FFT) every T/L time interval, where T is a time duration of one wavelet, thereby providing a sequence of non-overlapped wavelets carrying said information data distorted by a noise signal;

(c) analyzing said sequence of the non-overlapped wavelets by using the N-points FFT, thereby generating spectral frequency amplitudes of wavelet components of said non-overlapped wavelets;

(d) demodulating said spectral frequency amplitudes of the wavelet components, thereby to provide the information data.

6. The method of claim 5 further comprising a step of amplifying said distorted multicarrier signal before the separating of the overlapped wavelets.

7. The method of claim 5 further comprising a step of equalizing said spectral frequency amplitudes of the wavelet components before the demodulating step for eliminating phase-amplitude distortions of said distorted multicarrier signal, thereby providing corrected spectral frequency components.

8. The method of claim 5 wherein said communication line is a pair of copper wires.

9. The method of claim 5 wherein the prototype wavelet is represented as a sum of K cosine functions, to wit:

$$W(t) = \sum_{n=1}^{n=K} a_n \cos(2\pi n t / T),$$

where T is a length of the wavelet; n is a natural number counting the frequency components of the wavelet; K is a number of the all frequency components of the prototype wavelet; and $a_n$ is the amplitude of the n-th frequency component of the prototype wavelet.

10. The method of claim 7 wherein the step of equalizing said spectral frequency components of the wavelets includes dividing said spectral frequency amplitudes of the wavelets by a frequency response of the communication line.

11. The method of claim 5 wherein the step of demodulating said spectral frequency amplitudes of the received wavelet includes generating information data D according to the equation $$D = \sum_{k=1}^{(K-1)/2+1} (\hat{a}_k + \tilde{a}_k) a_k + \hat{a}_0 a_0,$$

where $\hat{a}_k$ and $\tilde{a}_k$ are the spectral amplitudes of the received wavelet centered at the spectral amplitude $\hat{a}_0$; $a_k$ is an amplitude of k-th frequency component of an original prototype wavelet centered at $a_0$; and K is a number of the all frequency components in every wavelet.

12. A transmitter for use with a multicarrier transceiver system for transmission of information data by modulated wavelets over a communication line through a plurality of subchannels, the transmitter comprising:

(a) a synthesis filter bank configured for obtaining said information data, obtaining predetermined coefficients representing amplitudes of frequency components of a prototype wavelet, and generating a signal representing modulated coefficients, said synthesis filter bank including:

at least one modulator having at least one multiplier configured for multiplying the information data by said amplitudes of frequency components, thereby modulating said predetermined coefficients by the information data; and an N-points IFFT unit coupled to the modulator, said N-points IFFT unit being configured for obtaining said signal representing the modulated coefficients, and for each sub-channel generating over a time interval T a sequence of L modulated non-overlapped wavelets modulated by the information data;

(b) an overlapping unit coupled to said synthesis filter bank, including: a parallel adder coupled to N output terminals of the N-points IFFT unit, and a shift register downstream of said parallel adder, said overlapping unit being configured for
(i) starting the overlapping by storing in the shift register zero values;
(ii) for each of a plurality of IFFT cycles adding output IFFT data obtained in step (d) that represent the modulated non-overlapped wavelets obtained by N-points IFFT unit at the current cycle to the shift register for storing therein;
(iii) for each of the plurality of IFFT cycles shifting the data stored in the shift register on a number P of points equal to N/L;
(iv) providing every IFFT cycle the data from the first P points of the shift register to said communication line for transmitting therethrough;
(v) filling the last P points with zeros; and
(vi) repeating steps (ii) to (v) L times for generating a multicarrier signal carrying said information data including the entire overlapped wavelet sequence.

13. The transmitter of claim 12 further comprising a digital-to-amplitude (D/A) converter downstream of the overlapping unit.

14. The transmitter of claim 13 further comprising a line driver downstream of the D/A converter configured for amplifying said multicarrier signal.

15. The transmitter of claim 12 wherein said communication line is a pair of copper wires.

16. The transmitter of claim 12 wherein the prototype wavelet is represented as a sum of K cosine functions, to wit:

$$W(t) = \sum_{n=1}^{n=K} a_n \cos(2\pi n t / T),$$

where T is a length of the wavelet; n is a natural number counting the frequency components of the wavelet; K is a number of the frequency components of the wavelet; and $a_n$ is the amplitude of the n-th frequency component of the prototype wavelet.

17. A receiver for use with a multicarrier transceiver system for transmission of information data over a communication line, the receiver comprising:
(a) a separating unit including:
(i) a separating shift register configured for obtaining a distorted multicarrier signal comprising a sequence of L overlapped subchannel modulated wavelets carrying said information data together with a noise signal provided by said communication line during the transmission, and
separating said overlapped wavelets by shifting the wavelets with respect to each other on a number of samples equal to N/L points of an N-point FFT every T/L time interval, where T is a time duration of one wavelet, thereby providing a sequence of the wavelets carrying said information data; and
(ii) a parallel register arranged downstream of said separating shift register and configured for storing the sequence of the wavelets provided by the separating shift register;
(b) an analyzing filter bank downstream of the separating unit configured for obtaining said sequence of the wavelets and demodulating thereof, thereby to provide said information data, said analyzing filter bank includes:
(i) an N-points FFT unit configured for obtaining said sequence of the non-overlapped wavelets from the parallel register and generating spectral frequency amplitudes of the wavelet components of said non-overlapped wavelets; and
(ii) a demodulator coupled to said N-points EFT unit and configured for obtaining said spectral frequency amplitudes of the wavelets and generating a signal representing said information data.

18. The receiver of claim 17 comprising an A/D converter unit coupled to said separating unit.

19. The receiver of claim 18 comprising an amplifier arranged before the A/D converter.

20. The receiver of claim 17 wherein the demodulator includes:
at least one multiplier configured for multiplying each of the spectral frequency amplitudes by a certain coefficient;
at least one adder coupled to said at least one multiplier and configured for combining results of the multiplying for each wavelet; and
a decision circuit coupled to the adder and configured for quantizing the data obtained therefrom.

21. The receiver of claim 17 wherein said demodulator generates information data D according to the equation $$D = \sum_{k=1}^{(K-1)/2+1} (\hat{a}_k + \tilde{a}_k) a_k + \hat{a}_0 a_0,$$

where $\hat{a}_k$ and $\tilde{a}_k$ are the spectral amplitudes of the received wavelet centered at the spectral amplitude is an amplitude $\hat{a}_0$; $a_k$ is an amplitude of k-th frequency component of an original subchannel wavelet of the corresponding subchannel centered at $a_0$; and K is a number of the all frequency components in every wavelet.

22. The receiver of claim 17 comprising at least one equalizer coupled to N-points FFT unit and to the demodulator and configured for correcting amplitudes of spectral frequency components of the wavelets by a obtaining said spectral frequency amplitudes of the wavelets and eliminating phase-amplitude distortions of said distorted multicarrier signal received in the communication line.

23. The receiver of claim 17 wherein the equalizer includes at least one multiplier configured for multiplying said spectral frequency amplitudes of the wavelets by a frequency response of the communication line.

24. The receiver of claim 17 wherein the prototype wavelet is represented as a sum of K cosine functions, to wit:

$$W(t) = \sum_{n=1}^{n=K} a_n \cos(2\pi n t / T),$$

where T is a length of the wavelet; n is a natural number counting the frequency components of the wavelet; K is a number of the frequency components of the prototype wavelet; and $a_n$ is the amplitude of the n-th frequency component of the prototype wavelet.

* * * * *